(12) United States Patent
Kasamatsu et al.

(10) Patent No.: US 11,995,488 B2
(45) Date of Patent: May 28, 2024

(54) IMAGE RECORDING APPARATUS

(71) Applicant: BROTHER KOGYO KABUSHIKI KAISHA, Nagoya (JP)

(72) Inventors: Daisuke Kasamatsu, Chita (JP); Shunsuke Minamikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/058,350

(22) Filed: Nov. 23, 2022

(65) Prior Publication Data

US 2023/0169291 A1 Jun. 1, 2023

(30) Foreign Application Priority Data

Nov. 26, 2021 (JP) ................................. 2021-192176

(51) Int. Cl.
*G06K 15/16* (2006.01)
*B41J 11/70* (2006.01)

(52) U.S. Cl.
CPC ............... *G06K 15/16* (2013.01); *B41J 11/70* (2013.01)

(58) Field of Classification Search
CPC ................................. G06K 15/16; B41J 11/70
See application file for complete search history.

(56) References Cited

U.S. PATENT DOCUMENTS

| | | | |
|---|---|---|---|
| 2009/0168094 A1 | 7/2009 | Horiuchi et al. | |
| 2010/0053680 A1 | 3/2010 | Sato | |
| 2011/0216373 A1 | 9/2011 | Sugimoto | |
| 2012/0154862 A1* | 6/2012 | Wakana | H04N 1/2353 358/1.15 |
| 2020/0177735 A1 | 6/2020 | Tsukada | |
| 2021/0058528 A1 | 2/2021 | Deleverio et al. | |
| 2021/0300082 A1* | 9/2021 | Namba | H04N 1/0032 |
| 2022/0247879 A1 | 8/2022 | Maruyama | |
| 2023/0171353 A1 | 6/2023 | Kasamatsu et al. | |
| 2023/0199129 A1 | 6/2023 | Noda | |

FOREIGN PATENT DOCUMENTS

| | | |
|---|---|---|
| JP | 9-22153 A | 1/1997 |
| JP | 2020168784 A | 10/2020 |

OTHER PUBLICATIONS

Office Action dated Dec. 15, 2023 received in U.S. Appl. No. 18/049,765.

* cited by examiner

*Primary Examiner* — Ibrahim Siddo
(74) *Attorney, Agent, or Firm* — Scully, Scott, Murphy & Presser, P.C.

(57) ABSTRACT

An image recording apparatus, having a conveyer, an image recorder, a cutter assembly, a reader, a display device, a controller, and an operation interface, is provided. The controller is configured to control the reader to read the image of the readable medium, the image recorder to record the image of the readable medium read by the reader on the sheet, and the cutter assembly to cut the sheet at a predetermined position in a conveying direction. The operation includes a first receivable portion, through which a selection from the user for causing the controller to control the reader to read the image of the readable medium, control the image recorder to record the image of the readable medium read by the reader on the sheet, and control the cutter assembly to cut the sheet at the predetermined position is receivable in a single action.

25 Claims, 11 Drawing Sheets

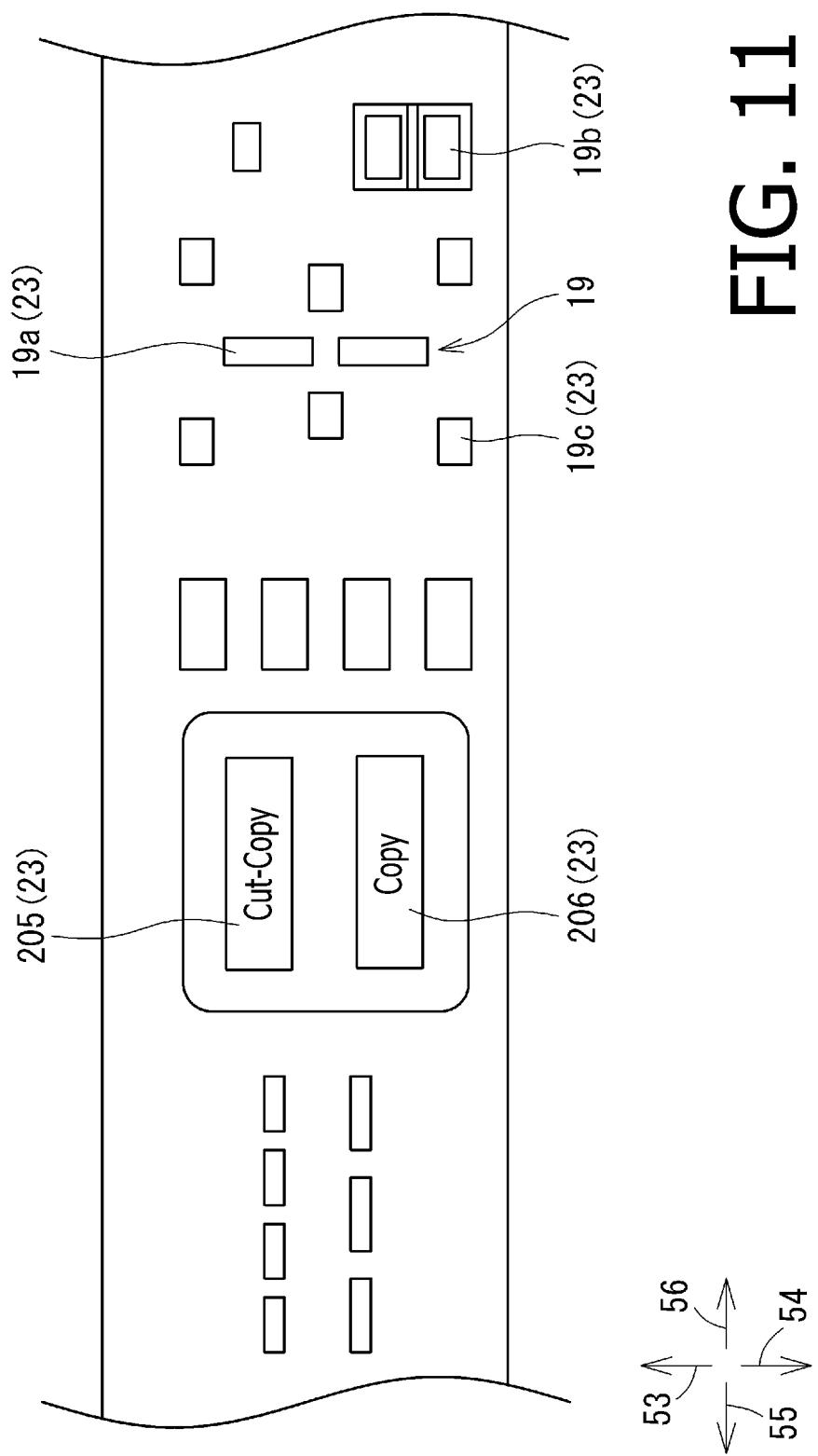

IMAGE RECORDING APPARATUS

REFERENCE TO RELATED APPLICATIONS

This application claims priority from Japanese Patent Application No. 2021-192176 filed on Nov. 26, 2021. The entire content of the priority application is incorporated herein by reference.

BACKGROUND ART

The present disclosure is related to an image recording apparatus having a cutter to cut a recording medium.

An image recording apparatus having a cutter to cut a sheet is known. The image recording apparatus may read an image of an original material with a scanner, form an image duplicated from the original material on a sheet of copier paper based on data of the image generated by the scanner, cut the sheet into smaller pieces with the cutter, and eject the pieces of paper outside the image forming apparatus.

Optionally, the image recording apparatus may form perforations rather than cutting the sheet completely into smaller pieces. A user may operate an operation interface of the image recording apparatus to enter settings for the copying operation, including a number of copies to be made, and select either a cutting operation or a perforating operation through a cut/perforation selecting button in the user interface.

DESCRIPTION

The selecting button may be provided in a same screen of a display device as the screen, through which the settings for the copying operation are entered. The user using the image forming apparatus may decide whether the sheet is to be cut or not through the selecting button based on his/her needs when making the duplicates of the original image.

Meanwhile, the user may be determined that the sheet needs to be cut or not before operating the image recording apparatus through the operation interface. In this regard, the user, after entering the selection for the copying operation, may be bothered by the need for further entering the selection for the cutting operation to cut the copier paper.

The present disclosure is advantageous in that an image recording apparatus, in which copying and cutting may be performed with a user's easier action, is provided.

FIG. 11 is an illustrative view of physical keys 23 in an image recording apparatus 10 in a second modified example.

Figure 1:
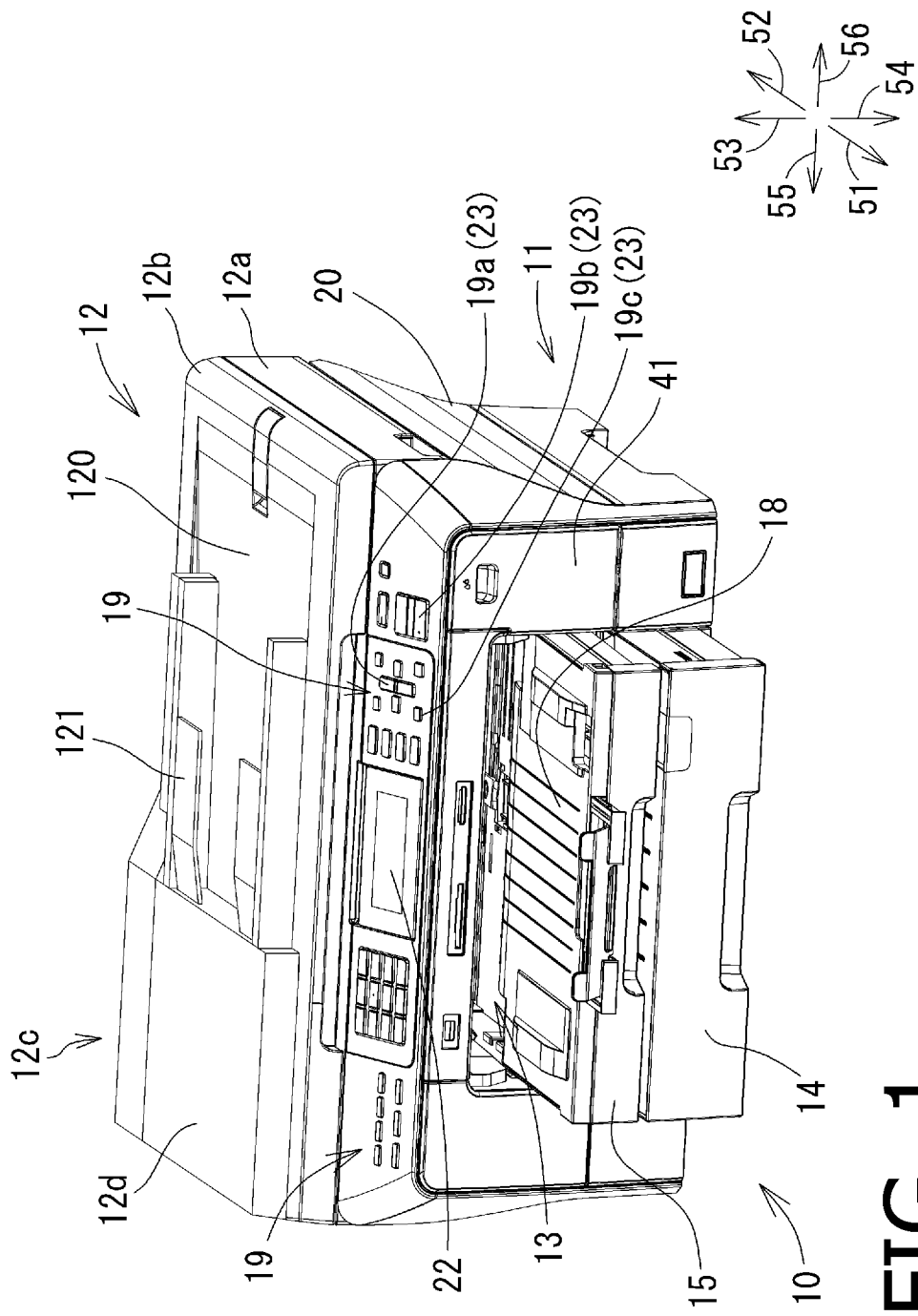
FIG. 1 is an exterior perspective view of an image recording apparatus 10.

In the following paragraphs, with reference to the accompanying drawings, an image recording apparatus 10 according to an embodiment of the present disclosure will be described. It is noted that the image recording apparatus 10 described below is merely an exemplary embodiment of the present disclosure, and various connections may be set forth between elements in the following description. These connections in general and, unless specified otherwise, may be direct or indirect and that this specification is not intended to be limiting in this respect. In the description below, an orientation, toward which a cavity 20a in a printer 11 is open through an opening 13, is defined as frontward 51, and an orientation opposite to the frontward 51 orientation is defined as rearward 52. A direction including the frontward 51 and rearward 52 orientations will be called as a front-rear direction 51, 52. A direction including upward and downward orientations intersecting orthogonally with the front-rear directions 51, 52 will be called as a vertical direction 53, 54. A direction including rightward and leftward orientations intersecting orthogonally with the front-rear direction 51, 52 and with the vertical direction 53, 54 will be called as a widthwise direction 55, 56. The upward and downward orientations along the vertical direction 53, 54 will be defined as upward 53 and downward 54, respectively. The leftward and rightward orientations along the widthwise direction 55, 56, when viewing the image recording apparatus 10 in the rearward 52 orientation, will be defined as leftward 55 and rightward 56, respectively.

As shown in FIG. 1, the image recording apparatus 10 is a multifunction peripheral machine including the printer 11 located at a lower position and a scanner 12 located at an upper position integrally. The image recording apparatus 10 may operate either independently or in conjunction with an external information device (not shown), such as a computer, a smartphone, and a tablet terminal, which may be connected with the image recording apparatus 10.

The image recording apparatus 10 has the scanner 12 providing a scanning function. The scanner 12 may read an image of an original document 9, generate image data to compose the image having been rad, and transmit the image data to, for example, the computer connected with the image recording apparatus 10 either in wire or wirelessly. Moreover, the image data may be transferred to and stored in a memory medium such as a memory card and a universal serial bus (USB) memory. The image recording apparatus 10 has the printer 11 providing a copying function. The printer 11 may record the image of the original document 9 based on the image data generated in the scanner 12 on a recording sheet 8. For providing a facsimile transmission/receiving function, the image recording apparatus 10 may transmit the image data generated by the scanner 12 to, for example, an external facsimile machine through telephone lines. The image recording apparatus 10 may receive facsimile data from the external facsimile machine and may record an image based on the received facsimile data on a recording sheet 8. The scanner 12 and the printer 11 are controlled by a controller 100 (see FIG. 5).

On an upper-frontward surface of the image recording apparatus 10, an operation interface 19 and a liquid-crystal display (LCD) 22 are arranged. The operation interface 19 may receive information input by a user. The operation interface 19 includes a first receivable portion 205, a second receivable portion 206, and a third receivable portion 207, which will be described in detail below.

The LCD 22 may display screens for visually providing information concerning the image recording apparatus 10 to the user. The image recording apparatus 10 may conduct operations based on commanding information from the user input through the operation interface 19. The controller 100 may control displaying the screens for showing information concerning the operations to be viewed by the user. The operation interface 19 has physical keys 23. The physical keys 23 include a selecting button 19*a*, an enter button 19*b*, and a clear button 19*c*. The selecting button 19*a* may be operated to move a highlighting object in the screen being displayed in the LCD 22. The selecting button 19*a* includes so-called cursor keys, through which the highlighting object, i.e., a cursor, may be moved upward 53, downward 54, leftward 55, or rightward 56. The enter button 19*b* may be operated to enter the selection of the item highlighted by the cursor. The clear button 19*c* may be operated to switch the screen back to an earlier screen or to cancel the selection.

[Printer 11]

Figure 2:
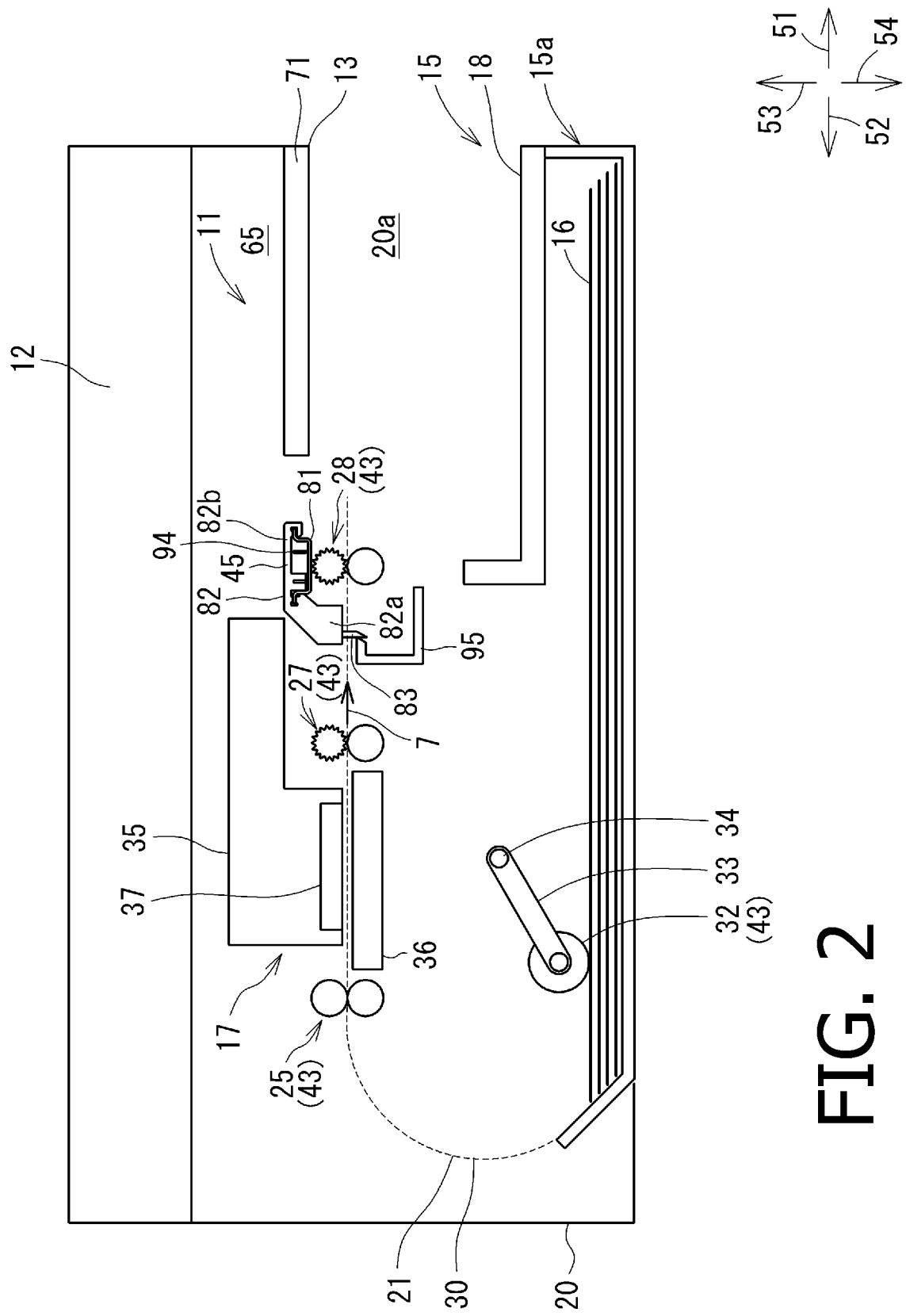
FIG. 2 is a schematic cross-sectional view of the image recording apparatus 10.
Figure 3:
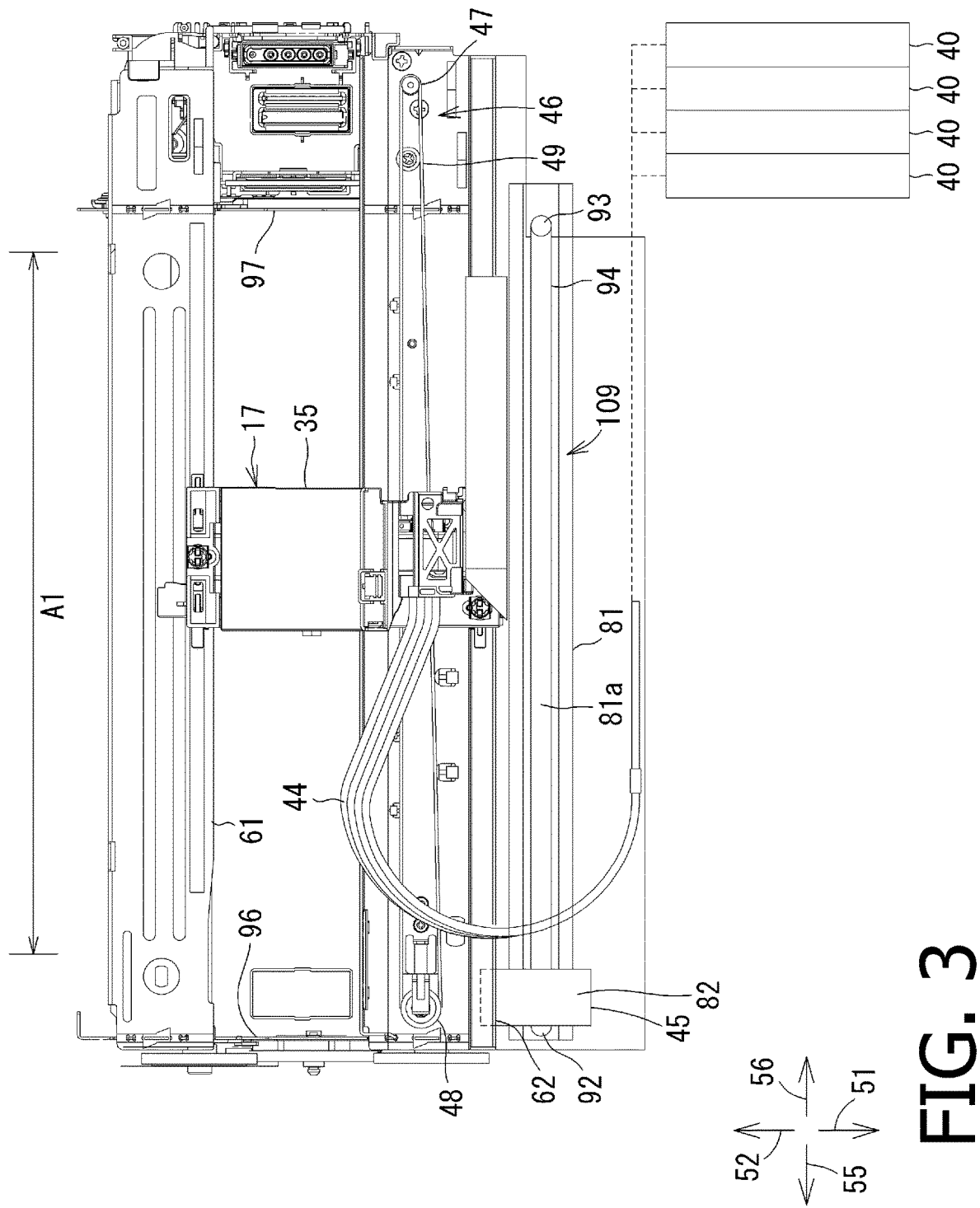
FIG. 3 is a plan view illustrating main components of the image recording apparatus 10.

With reference to FIGS. 1 through 3, the printer 11 will be described in detail. In FIG. 2, for efficiency in explanation, illustration of a feeder cassette 14 (see FIG. 1) is omitted.

As shown in FIGS. 1 and 2, the printer 11 has a housing 20. In the housing 20, the feeder cassette 14, a feeder cassette 15, a recorder 17, a cutter assembly 45, and other functional devices are arranged. On a front face of the housing 20, at a lower position with respect to the operation interface 19, the opening 13 is located. The opening 13 is located in a substantially central area in the widthwise direction 55, 56 on the front face of the housing 20. The opening 13 is formed in a rectangular shape longer in the widthwise direction 55, 56. The opening 13 ranges between an upper position in the front face and a lower end of the upper face in the housing 20.

The housing 20 has the cavity 20*a* ranging rearward from the opening 13. The cavity 20*a* is continuous with a conveyer path 21, which will be described further below. A ceiling 71 separates the cavity 20*a* from a board storing room 65, which is located rearward 51 with respect to the operation interface 19. In the board storing room 65, a board (not shown), on which electric circuits to be electrically connected with the operation interface 19 are mounted, is stored.

On the front face of the housing 20, at a position rightward 56 from the opening 13, an openable/closable cover 41 is attached. When the openable/closable cover 41 is open, a cartridge-attachable room is exposed, and ink cartridges 40 storing inks may be attached to or detached from the housing 20. The ink cartridges 40 may supply the inks to a recording head 37 in the recorder 17 through tubes 44.

The feeder cassette 14 and the feeder cassette 15 may be attached to or detached from the housing 20 along the front-rear direction 51, 52. The feeder cassette 14 is, when attached to the housing 20, located at a position below the feeder cassette 15. The feeder cassette 15 may accommodate a stack of recording sheets 8 in a standard size. The standard size of the recording sheets 8 may include, for example, A3, A4, B4, and B5 sizes of Japanese Industrial Standards. An ejection tray 18 is located at an upper position with respect to the feeder cassette 15. The ejection tray 18 may support the recording sheets 8 ejected from the conveyer path 21. In the present embodiment the image recording apparatus 10 has the feeder cassette 14 and the feeder cassette 15, which may store the recording sheets 8 in different sizes; however, optionally, the feeder cassette 14 may be omitted.

The feeder cassette 15 may retain recording sheets 8 therein. The recording sheets 8 may be stacked and retained inside the feeder cassette 15. The ejection tray 18 is formed on a frontward 51 side in the image recording apparatus 10, e.g., rightward in FIG. 2. FIG. 2 illustrates the feeder cassette 15 attached to the housing 20.

In the housing 20, as shown in FIG. 2, a conveyer 43 for conveying the recording sheets 8 from the feeder cassette 15 to the ejection tray 18 along the conveyer path 21 is arranged. The conveyer path 21 is a so-called U-turn path, which extends from the feeder cassette 15, curves upward 53 and frontward 51 in a form of U, and extends linearly frontward 51 to the ejection tray 18. A downstream end of the conveyer path 21 is continuous with the cavity 20*a*.

In the conveyer path 21, a feeder roller 32, a PF roller pair 25, a first ejection roller pair 27, and a second ejection roller pair 28 are arranged along a conveying direction in this given order from upstream to downstream. The feeder roller 32, the PF roller pair 25, the first ejection roller pair 27, and the second ejection roller pair 28 compose the conveyer 43.

The feeder roller 32 is located above the feeder cassette 15. The feeder roller 32 is rotatably arranged at a tip end of an arm 33 and may rotate on an axis, which coincides with the widthwise direction 55, 56. A basal end of the arm 33 is pivotable around a shaft 34. As the feeder roller 32 rotates, an uppermost one of the recording sheets 8 stacked on the feeder cassette 15 may be fed to the conveyer path 21.

The PF roller pair 25 is located in an area at a downstream end of the curve of the conveyer path 21 in the conveying direction. Each roller in the PF roller pair 25 is rotatable on an axis, which coincides with the widthwise direction 55, 56. The PF roller pair 25 may be rotated by a driving force of a conveyer motor 116 (see FIG. 5) transmitted thereto. The recording sheet 8 nipped by the PF roller pair 25 may be conveyed to a position below the recording head 37.

The first ejection roller pair 27 and the second ejection roller pair 28 are located in the conveyer path 21 at positions downstream from the recording head 37 in the conveying direction. The first ejection roller pair 27 is located upstream in the conveying direction from the second ejection roller pair 28. The first ejection roller pair 27 and the second ejection roller pair 28 may be rotated by the driving force from the conveyer motor 116 (see FIG. 5) transmitted thereto. The recording sheet 8 nipped by the first ejection roller pair 27 and/or the second ejection roller pair 28 may be conveyed to the ejection tray 18.

As shown in FIG. 2, the recorder 17 is located between the PF roller pair 25 and the first ejection roller pair 27. The recorder 17 may record images on the recording sheets 8 conveyed by the conveyer 43. The recorder 17 includes a carriage 35 located above the conveyer path 21, a platen 36 located below the conveyer path 21, and the recording head 37 mounted on the carriage 35.

The recording head 37 may be, as shown in FIGS. 2 and 3, a so-called inkjet-styled recording head, which may discharge minute droplets of inks in four colors of cyan (C), magenta (M), yellow (Y), and black (Bk) supplied from the ink cartridges 40 through the tubes 44 at the recording sheet 8. The recording head 37 may discharge the ink droplets while the carriage 35 reciprocates in the widthwise direction 55, 56, and thereby an image may be recorded on the recording sheet 8 being conveyed over the platen 36.

As shown in FIG. 3, the carriage 35 is slidably supported by guide frames 61, 62, which are distanced in the front-rear direction 51, 52 and extend in the widthwise direction 55, 56. The carriage 35 is mounted over the guide frames 61, 62 and may slide along the guide frames 61, 62 to reciprocate in the widthwise direction 55, 56.

On an upper surface of the guide frame 62, a belt driving assembly 46 is arranged. In the belt driving assembly 46, between a first pulley 47 and a second pulley 48, which are located on one end and the other end of the conveyer path 21 in the widthwise direction 55, 56, respectively, an endless belt 49 with teeth formed on an inner side thereof is strained. The first pulley 47 and the second pulley 48 are located on one end and the other end, respectively, of a reciprocating range of the carriage 35. A driving force from a CR motor 108 (see FIG. 5) may be input to a shaft of the first pulley 47, and the first pulley 47 may rotate. The rotation of the first pulley 47 may circulate the endless belt 49 and cause the second pulley 48 to rotate. Optionally, the endless belt 49 may be replaced with a belt with ends that may be fixed to the carriage 35.

The carriage 35 is coupled to the endless belt 49. Although the drawings do not show how the carriage 35 is coupled to the endless belt 49 in detail, in a condition where the carriage 35 and the endless belt 49 are coupled, the endless belt 49 is pulled slightly upward by the carriage 35. Therefore, a tensile force tending to recover downward is produced in the endless belt 49, and the carriage 35 may be resiliently urged against the guide frames 61, 62 by the tensile force. As the endless belt 49 circulates, the carriage 35 may reciprocate on the guide frames 61, 62. The recording head 37 is mounted on the carriage 35 and may reciprocate over the conveyer path 21 in a main scanning direction, which is the widthwise direction 55, 56.

[Cutter Assembly 45]

As shown in FIGS. 2 and 3, the cutter assembly 45 is located at a position frontward 51 from the recorder 17 above the conveyer path 21. The cutter assembly 45 is, when not operating, located leftward 55 with respect to an image recording range A1. The image recording range A1 is a maximum width of an area, in which an image is recordable on the recording sheet 8 by the recording head 37 reciprocating along with the carriage 35 and discharging the inks at the recording sheet 8. When, for example, a size of a maximum recording sheet 8 usable in the printer 11 is A4, the image recording range A1 may be substantially greater than a width of the A4 size.

The cutter assembly 45 may cut the recording sheet 8 conveyed by the conveyer 43 along the widthwise direction 55, 56. The cutter assembly 45 may cut the recording sheet 8 by moving rightward 56 from a stop position, i.e., a position of the cutter assembly 45 shown in FIG. 3, which is leftward 55 with respect to the image recording range A1. By cutting the recording sheet 8 with the cutter assembly 45, the recording sheet 8 in, for example, A4 size may be cut into two (2) A5-sized recording sheets 8. The cutter assembly 45 is supported by a guide rail 81, which extends along the widthwise direction 55, 56 and is fixed to side frames 96, 97. The cutter assembly 45 includes a cutter carriage 82, which is guided by the guide rail 81 to move along the widthwise direction 55, 56, a cutter 83 mounted on the cutter carriage 82, and a stationary blade 95. In FIG. 3, some detailed configuration of the cutter assembly 45 is omitted.

The cutter carriage 82 includes a cutter retainer 82a to retain the cutter 83 and a coupling portion 82b, at which the cutter carriage 82 is coupled to the guide rail 81. The cutter retainer 82a is located between the first ejection roller pair 27 and the second ejection roller pair 28. The cutter 83 is supported by the cutter retainer 82a in a posture protruding downward 54 from a lower end of the cutter retainer 82a. The cutter 83 is in a form of a disc and is rotatably supported by the cutter retainer 82a to rotate on an axis, which coincides with the front-rear direction 51, 52.

The coupling portion 82b extends frontward 51 from the cutter retainer 82a and is coupled to the guide rail 81.

The cutter carriage 82 is drivable by a driving assembly 109. The driving assembly 109 includes a driving pulley 92 and a driven pulley 93, which are arranged on an upper surface of a board 81a, and an endless belt 94, which is strained around the driving pulley 92 and the driven pulley 93. The driving pulley 92 and the driven pulley 93 are located on the upper surface of the board 81a at one end and the other end, respectively, of the board 81a in the widthwise direction 55, 56. The driving pulley 92 and the driven pulley 93 may rotate on axes, which extend along the vertical direction 53, 54. To the driving pulley 92, a driving force from a cutter motor 114 (see FIG. 5) may be transmitted. The endless belt 94 is coupled with the cutter carriage 82. As the driving pulley 92 rotates, the endless belt 94 circulates, and the driven pulley 93 is rotated. With the circulation of the endless belt 94, the cutter carriage 82 may reciprocate in the widthwise direction 55, 56 along the guide rail 81.

At a position below the cutter retainer 82a of the cutter carriage 82, the stationary blade 95 is located. The stationary blade 95 is supported by the side frames 96, 97 and extends in the widthwise direction 55, 56 through the image recording range A1. An edge of the stationary blade 95 is in contact with the cutter 83 from the rear side. The recording sheet 8 may be cut by the cutter 83 and the stationary blade 95 at a position between the cutter 83 and the stationary blade 95.

[Scanner 12]

Figure 4:
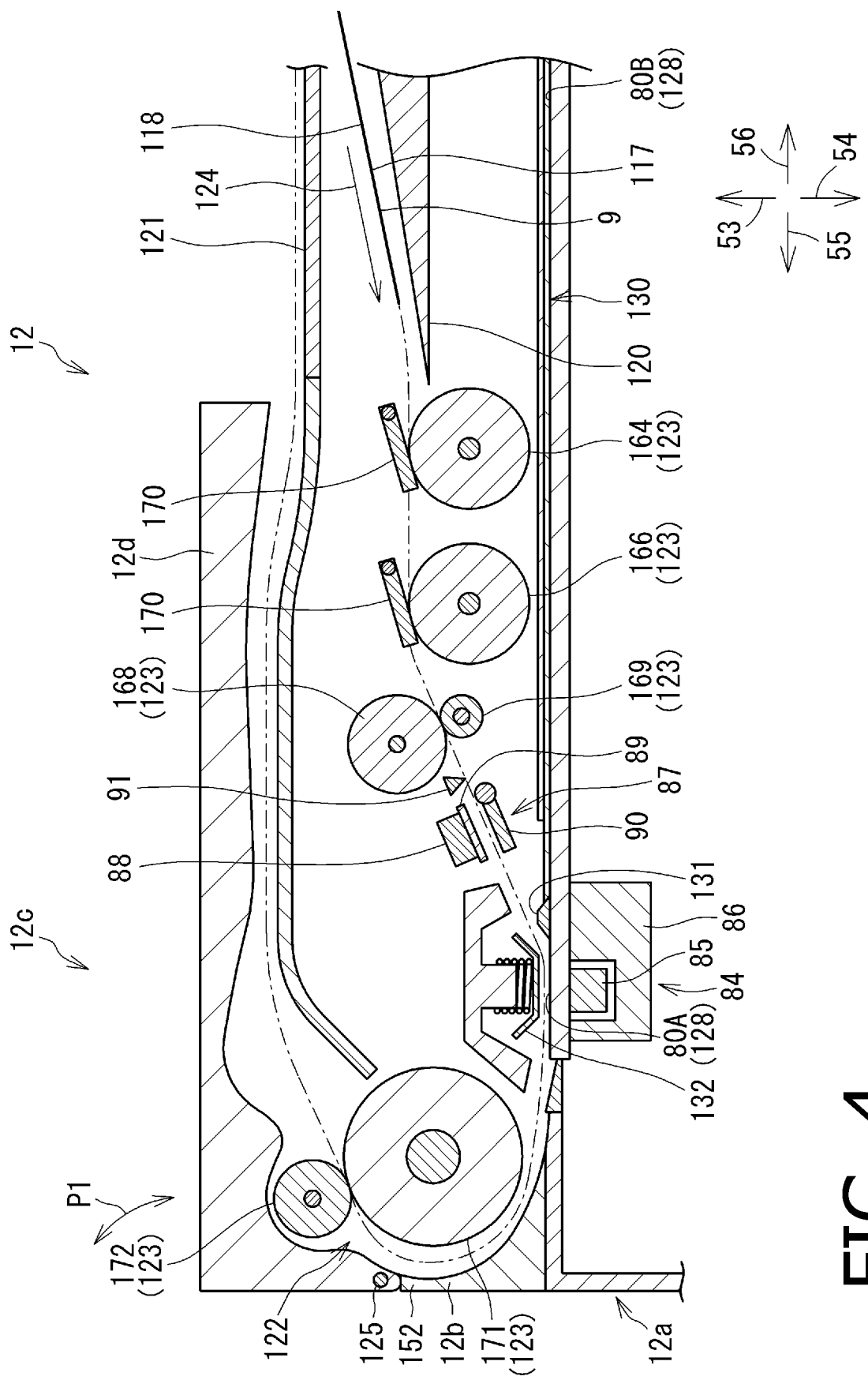
FIG. 4 is a schematic cross-sectional view of a scanner 12 in the image recording apparatus 10.

As shown in FIGS. 1 and 2, the scanner 12 is located above the printer 11. The scanner 12 is a so-called flatbed scanner. The scanner 12 includes a scanner body 12a located above the printer 11 and an original-document cover 12b located above the scanner body 12a. As shown in FIG. 4, on an upper side of the scanner body 12a, a platen glass 128, on which the original document 9 may be placed, is arranged. Inside the scanner body 12a, an image sensor, which may optically read an image of the original document 9 placed on the platen glass 128, is arranged. In the original-document cover 12b, an auto-document feeder (ADF) 12c is arranged. The ADF 12c may pick up and convey sheets contained in the original document 9, of which images may be read by the image sensor, one by one. The original document 9 may be in one of the sizes, e.g., A3, A4, B4, B5, in Japanese Industrial Standards. In the present embodiment, the exemplary size of the original document 9 is A4. In the following paragraphs, the sheet(s) contained in the original document 9 may be referred to as original sheet(s) 9.

The scanner 12 includes, as shown in FIG. 4, an ADF document tray 120, an ADF ejection tray 121, a conveyer path 122, a conveyer 123, a first reading sensor 85, and a second reading sensor 88.

The scanner 12 has the original-document cover 12b, which is attached to the scanner body 12a movably through a hinge (not shown) located on the rear side thereof. The original-document cover 12b is movable between an open position and a closed position with respect to the scanner body 12a including the platen glass 128.

The platen glass 128 is arranged on the upper side of the scanner body 12a. When the original-document cover 12b is in the closed position with respect to the scanner body 12a, the platen glass 128 is covered with the original-document cover 12b.

On a lower side of the original-document cover 12b, in other words, on a side of the original-document cover 12b toward the platen glass 128, an elastic board 130 is arranged.

The elastic board 130 may contact the platen glass 128 when the original-document cover 12b is located at the closed position. The elastic board 130 may press and stabilize the original document 9 placed on the platen glass 128.

At a leftward 55 position in the platen glass 128, a positioning member 131 that defines a border between a readable range 80A and a readable range 80b is arranged. The readable range 80A is a range, in which the image of the original document 9 may be read with use of the ADF 12c. The readable range 80B is a range, in which the image of the original document 9 may be read by the scanner 12 operating as the flatbed scanner. The positioning member 131 indicates a reference position for placing the original document 9 on the platen glass 128. The positioning member 131 may, when the ADF 12c is used, operate as a guide to direct the original document 9 passing over the readable range 80A to return to the conveyer path 122 arranged in the ADF 12c.

Inside the scanner body 12a, a first image-reading unit 84 is installed. The first image-reading unit 84 includes a first contact image sensor (CIS) 85 and a CIS carriage 86. The first CIS 85 is located at a position upstream with respect to a third roller 171, which will be described below, in a conveying direction 124 in the conveyer path 122. The first CIS 85 may optically read an image of the original document 9 from a lower side of the conveyer path 122. The first CIS 85 is mounted on the CIS carriage 86 and may reciprocate underneath the platen glass 128.

As shown in FIGS. 1 and 4, the original-document cover 12b at the upper position in the scanner 12 has the ADF document tray 120 and the ADF ejection tray 121, which are arranged vertically in tiers. The original document 9 ejected from the ADF 12c may be retained by the ADF ejection tray 121 to rest at the position vertically separated from the original document 9 remaining on the ADF document tray 120.

The ADF cover 12d is pivotable around a pivot shaft 125, which is located on a sideward end, e.g., leftward end in FIG. 4, of the ADF 12c, to pivot in directions of an arrow P1. When the ADF cover 12d pivots, the inner side of the ADF 12c may be partly exposed.

Inside the ADF 12c, a conveyer 123 is arranged in the conveyer path 122. The conveyer 123 may convey the original sheets 9 in the conveying direction 124 from the ADF document tray 120 to the ADF ejection tray 121. The conveyer 123 includes rollers, nipping pieces 170, and pinch rollers. The rollers in the conveyer 123 include first rollers 164, 166, second rollers 168, 169, and third rollers 171, 172.

Each original sheet 9 has a first side 117, which faces downward in a condition where the original document 9 is placed on the ADF document tray 120, and a second side 118, which faces upward in the condition where the original document 9 is placed on the ADF document tray 120. In other words, each original sheet 9 is placed on the ADF document tray 120 in an arrangement such that the first side 117 thereof faces downward.

The quantity and/or the arrangement of the components in the conveyer 123, including the first rollers 164, 166, the second roller 168, the third roller 171, and the nipping pieces 170 (see FIG. 5), may not necessarily be limited, but the conveyer 123 may optionally be modified to another known sheet conveyer. For example, the nipping pieces 170 may be replaced with rollers.

At a position downstream from the second rollers 168, 169 in the conveying direction 124, a document-sheet sensor 91 is located. The document-sheet sensor 91 may detect the original sheet 9 conveyed by the second rollers 168, 169. The document-sheet sensor 91 may detect a leading end and a trailing end of the original sheet 9 and thereby determine a size of the original sheet 9 before a reading process is conducted. The reading process will be described further below.

At a position downstream from the document-sheet sensor 91 in the conveying direction 124, a second image-reading unit 87 is located. The second image-reading unit 87 includes a second contact image sensor (CIS) 88, a second platen 89 having a form of a plate, and a document-supporting member 90 for supporting the original sheet 9 being conveyed. The second image-reading unit 87 may read an image of the second side 118 of the original sheet 9. The second side 118 is the upper side of the original sheet 9 when the original document 9 is placed on the ADF document tray 120. The second CIS 88 may optically read the image of the original sheet 9 from an upper side of the conveyer path 122.

At a position downstream from the second image-reading unit 87 in the conveying direction 124, the positioning member 131 is located. The positioning member 131 may guide the original sheet 9 passing through the second image-reading unit 87 to a position between the platen glass 128 and an original-sheet guide 132.

At a position downstream from the positioning member 131 in the conveying direction 124, the first image-reading unit 84 is located. The first image-reading unit 84 may read an image of the first side 117 of the original sheet 9. The first side 117 is the lower side of the sheet of the original sheet 9 when the original document 9 is placed on the ADF document tray 120.

The original-sheet guide 132 is located at a position to face the first image-reading unit 84 in the original-document cover 12b. The original-sheet guide 132 has a horizontal part facing the readable range 80A and slant parts that extend upper-rightward and upper-leftward from an upstream end and a downstream end of the horizontal part in the conveying direction 124. The original-sheet guide 132 is urged toward the readable range 80A by a spring fixed to the ADF body 152.

The first rollers 164, 166, the second roller 168, and the third roller 171 may be rotated by a driving force from an LF conveyer motor 110 (see FIG. 5) transmitted thereto.

[Configuration of Controller 100 and Devices]

Figure 5:
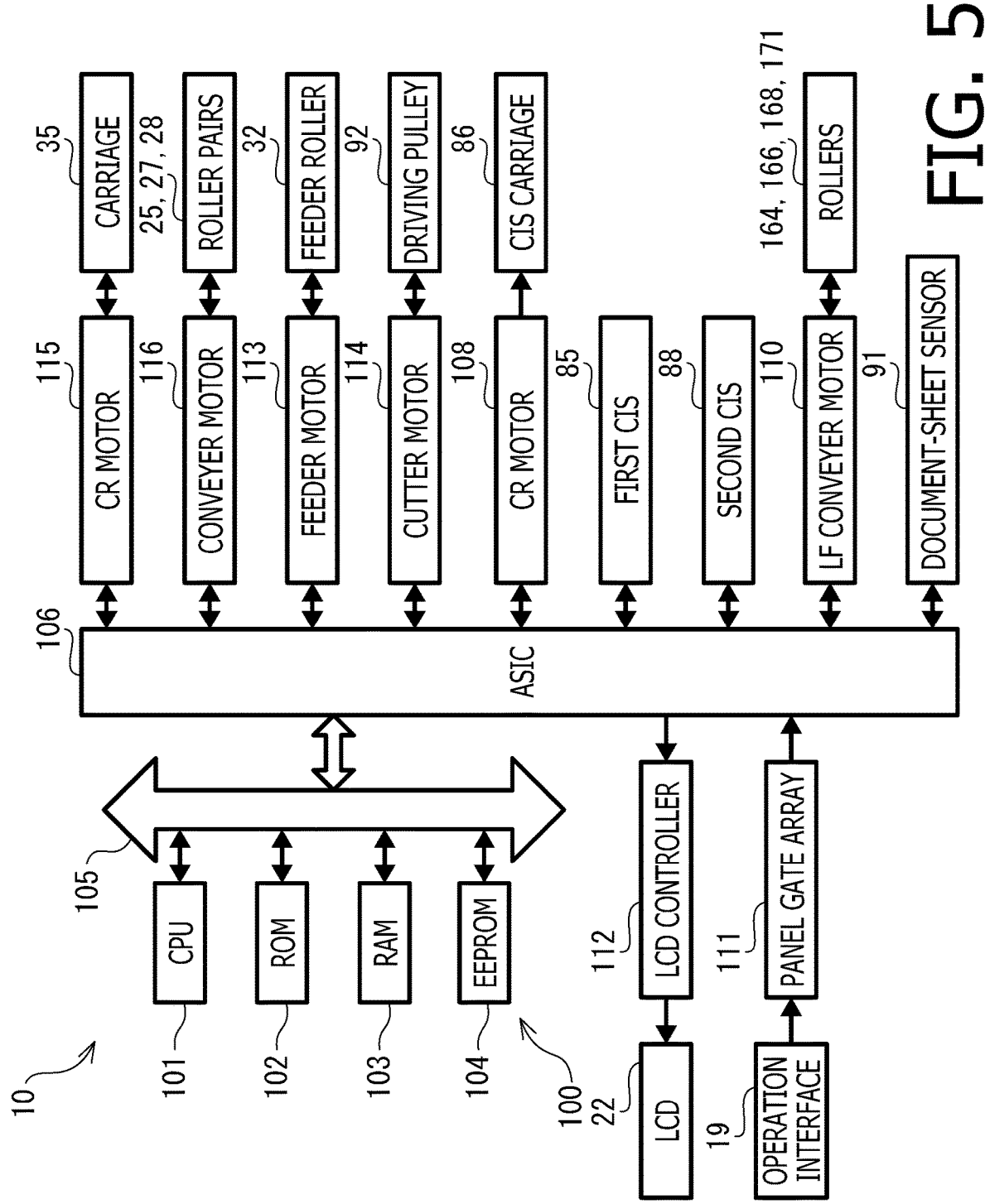
FIG. 5 is a block diagram of the image recording apparatus 10.

FIG. 5 shows the controller 100 and peripheral devices in the image recording apparatus 10. The controller 100 may control overall operations and processes performed in the printer 11 and the scanner 12. The controller 100 may be a microcomputer having a central processing unit (CPU) 101, a read-only memory (ROM) 102, a random access memory (RAM) 103, an electrically erasable and programmable ROM (EEPROM) 104, which are connected with an application specific integrated circuit (ASIC) 106 through busses 105.

The ROM 102 stores data including programs to control operations in the image recording apparatus 10. The EEPROM 104 stores data to be used in processes conducted in accordance with the programs. The RAM 103 may be used as a storage area to temporarily record data to be used in the programs run by the CPU 101 and as a work area to spread the programs.

The CPU 101 may generally control peripheral devices that compose the controller 100 and other devices that are controllable by the controller 100. The CPU 101 may run the programs stored in the ROM 102 and read the data stored in the RAM 103 and the EEPROM 104 to perform computations according to the programs.

The ASIC 106 is connected with the first CIS 85 and the second CIS 88 that may read the images of the original sheet 9 in the scanner 12. The ASIC 106 may provide electrical signals for operating light sources to emit light and timing signals for obtaining image data from photoelectric converting devices to the first CIS 85 and the second CIS 88. The first CIS 85 and the second CIS 88 receiving these signals may operate the light sources to emit light at the original sheet 9 at predetermined timing and output the image data converted in the photoelectric converting devices to the ASIC 106.

The ASIC 106 is connected with a panel gate array 111. The panel gate array 111 may control the operation interface 19, through which the user may input commands to the image recording apparatus 10. The panel gate array 111 may detect pressing actions in the operation interface 19 and output predetermined code signals to the ASIC 106. The CPU 101 receiving predetermined key codes from the panel gate array 111 may perform a predetermined controlling process in accordance with a predetermined key-processing table. The key-processing table is a table, in which key codes and controlling processes are associated with one another, and may be stored in, for example, the ROM 102.

The ASIC 106 is connected with an LCD controller 112, which may control contents to be displayed in the LCD 22. The LCD controller 112 may control the LCD 22 based on commands from the CPU 101 to display information concerning the operations in the printer 11 and the scanner 12 in the screen.

The ASIC 106 is connected with the document-sheet sensor 91, which may detect the leading edge and the trailing edge of the original sheet 9 in the conveyer path 122 (see FIG. 4) in the ADF 12c.

Moreover, the ASIC 135 is connected with motors including the CR motor 115, the conveyer motor 116, the feeder motor 113, the cutter motor 114, and the CR motor 108. On the ASIC 135, driving circuits to control the CR motor 115, the conveyer motor 116, the feeder motor 113, the cutter motor 114, and the CR motor 108 are mounted. The CPU 101 may output driving signals to activate the motors to the respective driving circuits. The driving circuits receiving the driving signals from the CPU 101 may output driving currents corresponding to the driving signals to the respective motors. Thereby, the CR motor 115, the conveyer motor 116, the feeder motor 113, the cutter motor 114, and/or the CR motor 108 may rotate. In other words, the controller 100 may control the feeder motor 113 to feed the recording sheets 8 to the conveyer path 21, control the conveyer motor 116 to operate the conveyer 43 to convey the recording sheets 8, control a CR motor 115 to move the carriage 35, control the cutter motor 114 to control the driving pulley 92, and control the CR motor 108 to move the CIS carriage 86.

[Processes by Controller 100]

The controller 100 may perform processes including a reading process, an image recording process, a cutting process, and a displaying process. In the present embodiment, the controller 100 performs the displaying process, and thereafter the reading process and the image recording process, and further thereafter the cutting process.

In the reading process, the scanner 12 reads the image of the original document 9. The reading process includes a first reading process to read the image of the first side 117 of the original sheet 9 and a second reading process to read the image of the second side 118 of the original sheet 9. As shown in FIG. 4, the user using the image recording apparatus 10 may set the original document 9 including a plurality of original sheets 9 on the ADF document tray 120 in the arrangement such that the first side 117 of each original sheet 9 faces downward.

In response to receiving a command to start reading the images, the controller 100 drives the LF conveyer motor 110 (see FIG. 5). As the LF conveyer motor 110 rotates, the first rollers 164, 166, the second roller 168, and the third roller 171 rotate, and a lowermost one of the original sheets 9 is conveyed from the ADF document tray 120.

The document-sheet sensor 91 detects a leading edge of the original sheet 9 conveyed from the ADF document tray 120. Based on signals indicating the detection from the document-sheet sensor 91, the controller 100 operates the conveyer 123 to convey the original sheet 9 by a predetermined distance and starts the first reading process with the first CIS 85 and the second reading process with the second CIS 88.

The original sheet 9 is conveyed in the conveyer path 122 with the first side 117 facing downward 54 and the second side 118 facing upward 53. The second CIS 88 in the second image-reading unit 87 may read the image on the second side 118 of the original sheet 9.

The original sheet 9, of which image on the second side 118 was read by the second CIS 88, is guided by the positioning member 131 and reaches the first image-reading unit 84. The image on the first side 117 of the original sheet 9 is read by the first CID 85 thereat. Thereafter, the leading edge of the original sheet 9 is guided upper-leftward, and the original sheet 9 is conveyed in the curve around an outer peripheral surface of the third roller 171 to turn rightward 56.

The original sheet 9 nipped between the third rollers 171, 172 is conveyed downstream in the conveying direction 124. The controller 100 operates the conveyer 123 to convey the original sheet 9 having been read by a predetermined distance to eject at the ADF ejection tray 121.

In the image recording process, the images of the original sheet 9 having been read in the reading process are recorded on the recording sheet 8 by the recorder 17. In the cutting process, the recording sheet 8 with the images recorded thereon in the recording process is cut at a center of the recording sheet 8 in the conveying direction 124 by the cutter assembly 45. The following paragraphs describe an exemplary case that the images of the original sheet 9 in the A4 size are minified into A5-sized images to be recorded on one side of an A4-sized recording sheet 8, and the recording sheet 8 is cut into two A5-sized recording sheets 8.

The controller 100 drives the feeder motor 113 to rotate the feeder roller 32. As shown in FIG. 2, an uppermost one of the A4-sized recording sheets 8 may be fed from the feeder cassette 15 to the conveyer path 21. The controller 100 drives the conveyer motor 116 to rotate the PF roller pair 25. Thereby, the recording sheet 8 fed from the feeder cassette 15 to the conveyer path 21 may be conveyed by the PF roller pair 25 to a position below the recording head 37 and pause thereat where the platen 36 supports the recording sheet 8 from the lower side.

While the recording sheet 8 pauses, the controller 100 may drive the CR motor 115 to move the carriage 35 in the widthwise direction 55, 56. Simultaneously, the controller 100 operates the recording head 37 to discharge the inks at the recording sheet 8. Thereby, a line of image may be recorded in a single pass on the recording sheet 8. The controller 100 may control conveying and stopping the recording sheet 8 alternately and record lines of images in a predetermined number of passes until an image is completed on the recording sheet 8. In the present example, the completed image includes two A5-sized images. In particular, the controller 100 may minify the A4-sized image of the first side 117 of the original sheet 9 read in the first reading process and the A4-sized image of the second side 118 of the original sheet 9 read in the second reading process into A5-sized images and record the two minified images on the recording sheet 8. As the recorder 17 records the image, the controller 100 may drive the conveyer motor 116 to rotate the first ejection roller pair 27. Thereby, the recording sheet 8 passing over the platen 36 may be conveyed to a position below the cutter assembly 45.

As the center of the recording sheet 8 in the conveying direction 124 reaches the position below the cutter assembly 45, the controller 100 may drive the cutter motor 114 to rotate the driving pulley 92. Thereby, the cutter carriage 82 may move rightward 56 from the stop position, e.g., the position of the cutter assembly 45 shown in FIG. 3, along the guide rail 81. Accordingly, the A4-sized recording sheet 8 located between the cutter 83 and the stationary blade 95 may be cut at the center in the conveying direction 124 along the widthwise direction 55, 56 to produce two A5-sized recording sheets 8. The A5-sized recording sheets may be conveyed by the second ejection roller pair 28 and ejected from the conveyer path 21 at the ejection tray 18.

In the present embodiment, the displaying process is performed prior to the reading process, the image recording process, and the cutting process. In other words, the displaying process is a process, through which the user is allowed to select performing of the reading process, the image recording process, and the cutting process collectively. In the displaying process, the controller 100 may operate the LCD 22 to display information concerning the image recording apparatus 10 and figures and icons that are selectable by the user's actions received through the operation interface 19.

Figure 6:
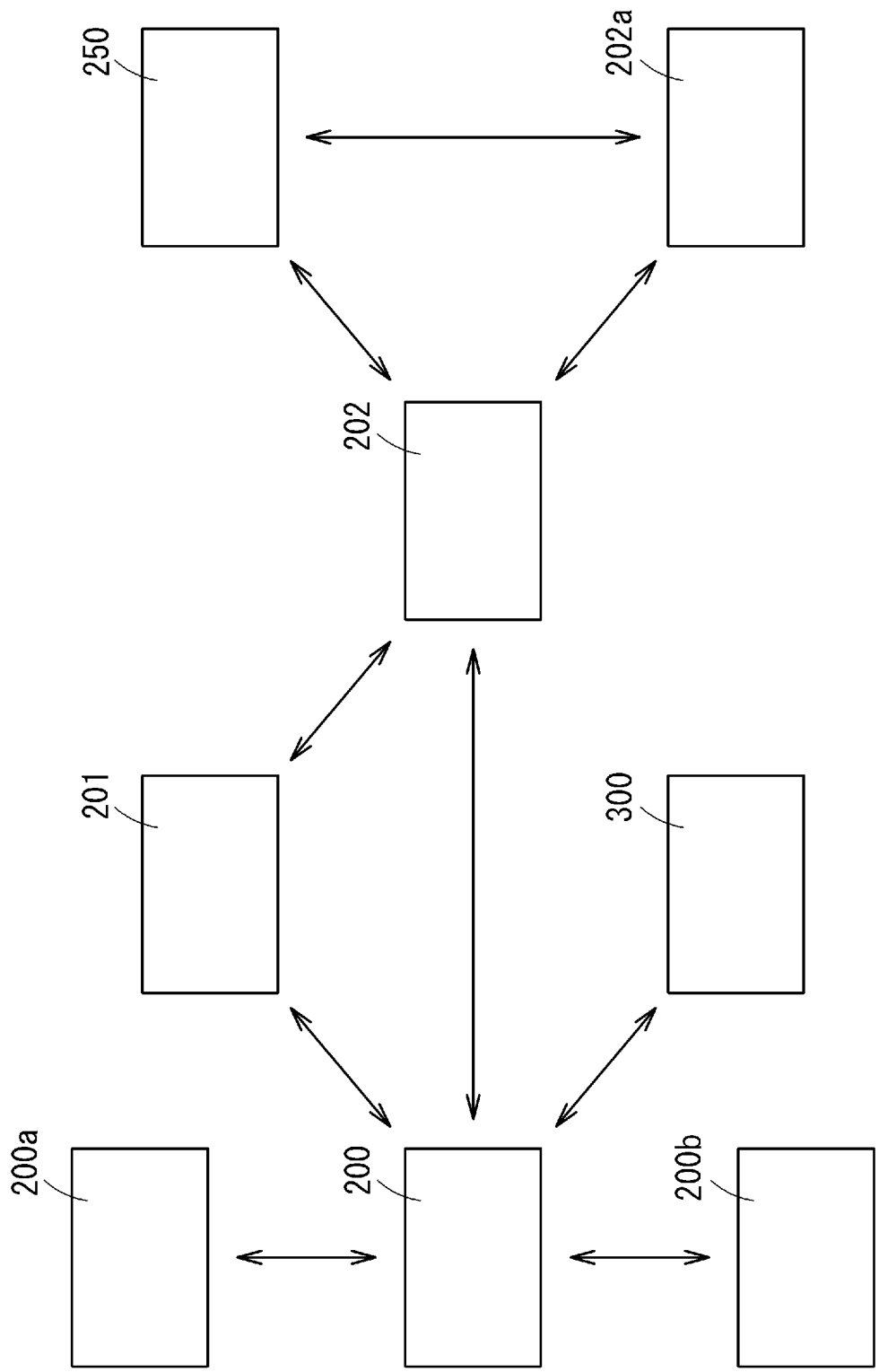
FIG. 6 is an illustrative view of screens to be displayed in a liquid-crystal display (LCD) 22.
Figure 7:
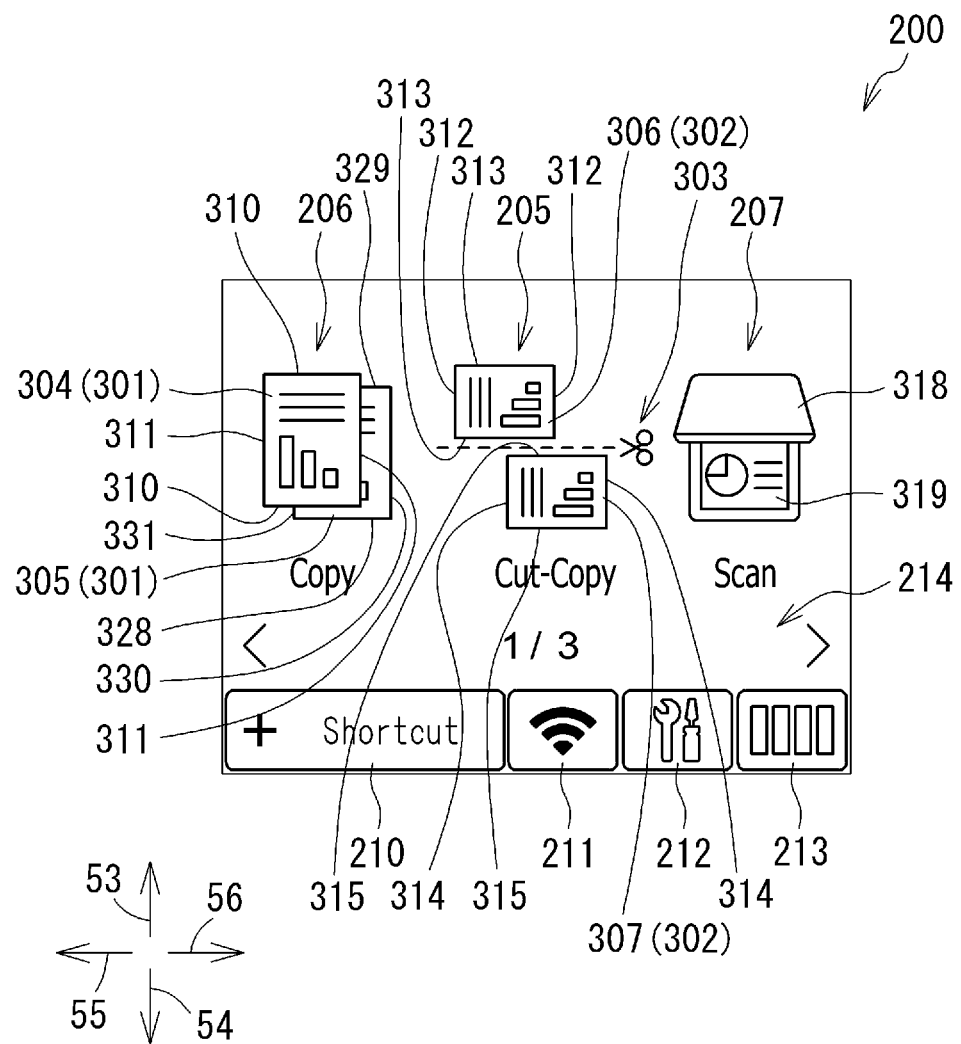
FIG. 7 is an illustrative view of a first display screen 200 to be displayed in the LCD 22 of the image recording apparatus 10.

As shown in FIGS. 6 and 7, in the displaying process, the controller 100 may switch screens in the LCD 22 according to the user's input through the operation interface 19 selecting the icons associated with the reading process, the image recording process, the cutting process.

The controller 100 may display a first display screen 200 in the LCD 22 when the image recording apparatus 10 is powered on. Moreover, the controller 100 may display the first display screen 200 in the LCD 22 when the image recording apparatus 10 wakes up from an energy-saving sleeping mode to a standby mode. In other words, the first display screen 200 is displayed as not only a home screen but also a standby screen.

As shown in FIG. 6, for providing a function other than the functions that may be provided to the user through the first display screen 200, based on the user's input through the operation interface 19, the controller 100 may display one of auxiliary screens 200a, 200b to present the other functions to the user. While the auxiliary screen 200a or 200b is displayed, when the user presses the clear button 19c (see FIG. 1), the controller 100 may display the first display screen 200. In the present embodiment, detailed description of the auxiliary screens 200a, 200b is omitted.

The user may enter selection for the reading process, the image recording process, and the cutting process to be performed sequentially through the first display screen 200. For entering the selection for the reading process, the image recording process, and the cutting process, the user may operate the selecting button 19a (see FIG. 1) to select a first receivable portion 205 (see FIG. 7) displayed in the first display screen 200 and press the enter button 19b (see FIG. 1). In response, the controller 100 may display either a message screen 201 (see FIG. 8) or a second display screen 202 (see FIG. 9). While the message screen 201 or the second display screen 202 is being displayed, the user may press the clear button 19c, and in response, the controller 100 may display the first display screen 200 in the LCD 22. The message screen 201 is a screen to explain to the user that the cutting process will accompany the copying performance. The message screen 201 may be omitted in a next occasion based on the user's preference entered through the operation interface 19.

On the other hand, the user may enter selection for the reading process and the image reading process, not accompanied by the cutting process, to be performed sequentially through the first display screen 200. In the following paragraphs, the reading process and the image recording process to be performed sequentially may be collectively called as a duplicating process. For entering the selection for the duplicating process, the user may operate the selecting button 19a to select a second receivable portion 206 (see FIG. 7) displayed in the first display screen 200 and press the enter button 19b. In response, the controller 100 may display a copy setting screen 300 (see FIG. 6), through which settings concerning the reading process and the image recording process may be entered. While the copy setting screen 300 is being displayed, the user press the clear button 19c, and in response, the controller 100 may display the first display screen 200. The copy setting screen 300 is a screen, through which the user may enter settings concerning copying, such as a size of the recording sheet 8, an imaging quality, a magnifying or minifying rate. In the present embodiment, however, detailed explanation of the copy setting screen 300 is omitted.

While the second display screen 202 is being displayed, the user may enter a setting for a size of the original document 9. In particular, the user may operate the selecting button 19a to select a first size-change receivable portion 225 in a size-change receivable portion 248 displayed in the second display screen 202 and press the enter button 19b. In response, the controller 100 may display a second screen 250 (see FIG. 6), through which the size of the original document 9 may be entered. While the second screen 250 is being displayed, the user may act on the operation interface 19 to select the size of the original document 9 presented in the second screen 250. In response, the controller 100 may display the second display screen 202 or 202a, which is adapted to the size of the original document 9 selected through the second screen 250. While the second screen 250 is being displayed, the user may press the clear button 19c, and in response, the controller 100 may display the second display screen 202 in the LCD 22.

Next, the first display screen 200, the message screen 201, and the second display screen 202 will be described in detail below.

As shown in FIG. 7, the first display screen 200 contains the first receivable portion 205, the second receivable portion 206, and a third receivable portion 207, which align in the widthwise direction 55, 56, in an upper area. Moreover, the first display screen 200 contains a shortcut icon 210, a communication setting icon 211, an environment setting icon 212, and an ink remainders icon 213 in a lower area. In a middle area between the upper area and the lower area in the vertical direction 53, 54 in the first display screen 200, a switcher icon 214 is arranged.

Each of the first receivable portion 205, the second receivable portion 206, and the third receivable portion 207 is selectable by the user's action on the operation interface 19 (see FIG. 1). The first receivable portion 205, the second receivable portion 206, and the third receivable portion 207 may be icons composed of figures and text. Although not shown in the drawings, while one of the first receivable portion 205, the second receivable portion 206, and the third receivable portion 207 is temporarily selected, the icon of the selected receivable portion may be highlighted. The user may operate the selecting button 19a to move the highlighting in the first display screen 200 to select another icon.

The second receivable portion 206 may receive a command from the user that causes the image recording apparatus 10 to perform the duplicating process. In other words, through the second receivable portion 206, the user may enter the selections of the reading process and the image recording process in a single inputting action. The second receivable portion 206 contains a first icon 301.

The first icon 301 includes rectangular figures that represent the recording sheets 8. The first icon 301 may include text "Copy" at a lower position with respect to the rectangular figures representing the recording sheets 8. The text "Copy" notes the function that is available through the first icon 301. The first icon 301 is located on one side in the widthwise direction 55, 56 in the first display screen 200. In particular, the first icon 301 may be located at a position leftward 55 in the first display screen 200. The first icon 301 includes the rectangular figures representing the recording sheets 8, on which the images of the original document 9 having been read in the reading process are recorded in the image recording process. The rectangular figures include a plurality of rectangles including a first rectangle 304 and another rectangle 305. The first rectangle 304 and the another rectangle 305 are displayed in an arrangement such that the first rectangle 304 is laid over the another rectangle 305 to appear closer to the viewer, i.e., frontward 51. The first rectangle 304 contains figures representing an image read from the original document 9 in the reading process and recorded on the recording sheets 8.

The first rectangle 304 represents a first page to be recorded on the recording sheet 8 and is illustrated in a vertically elongated figure, i.e., in a posture where one of shorter sides 310 is located on an upper side in the vertical direction 53, 54. Moreover, the figures representing the image read from the original document 9 are arranged in an orientation that enables the user to recognize the upper side of the first rectangle 304 coincides with the upper side of the recording sheet 8. For example, the figures representing the image read from the original document 9 may include three (3) horizontal lines arranged in an upper area and a bar chart arranged in a lower area. In this arrangement, the user may recognize the recording sheet 8 is in an upside-up orientation.

The first rectangle 304 has the two (2) shorter sides 310 and two (2) longer sides 311. The shorter sides 310 of the first rectangle 304 are located at positions along the vertical direction 53, 54 in the first display screen 200. The longer sides 311 of the first rectangle 304 are located at positions along the widthwise direction 55, 56 in the first display screen 200. The shorter sides 310 of the first rectangle 304 are parallel with longer sides 313 of a second rectangle 306, which will be described below.

The another rectangle 305 represents a second page to be recorded on the recording sheet 8 and is illustrated in the vertically elongated figure, i.e., in the posture where one of shorter sides is located on an upper side in the vertical direction 53, 54, similarly to the first rectangle 304. The another rectangle 305 has a shorter side 328, a part 329 of a shorter side, a longer side 330, and a part 331 of a longer side. The shorter side 328 and the part 329 of the shorter side of the another rectangle 305 are located at an upper position and a lower position along the vertical direction 53, 54 in the first display screen 200, respectively. The longer side 330 and the part 331 of the longer side of the another rectangle 305 are located at positions leftward 55 and rightward 56, respectively, along the widthwise direction 55, 56 in the first display screen 200. In another words, the another rectangle 305 is displayed in an arrangement such that the another rectangle 305 at least partly overlaps the first rectangle 304 but does not overlap the first rectangle 304 entirely. It may be noted that the figures representing the images from the original document 9 may not necessarily be identical or similar to any actual figure or text appearing on the original document 9. The another rectangle 305 may include three (3) horizontal lines arranged in an upper area and a bar chart arranged in a lower area.

The first receivable portion 205 may receive a command from the user that causes the image recording apparatus 10 to perform the reading process, the image recording process, and the cutting process in a single inputting action. The first receivable portion 205 contains a second icon 302 and a third icon 303.

The second icon 302 includes rectangular figures that represent the recording sheet 8 having been cut into pieces. The second icon 302 includes two (2) rectangles, which are smaller than the first rectangle 304 in the first icon 301. In particular, the second icon 302 include a second rectangle 306 and a third rectangle 307, and a sum of areas of the second rectangle 306 and the third rectangle 307 is substantially equal to an area of the first rectangle 304. In this arrangement, the user may recognize that the second rectangle 306 and the third rectangle 307 are in a half size of the first rectangle 304. In other words, the user may easily recognize that the second rectangle 306 and the third rectangle 307 represent the pieces of the recording sheet 8 cut in half in the cutting process. The second icon 302 may include text "Cut-Copy" at a lower position with respect to the second rectangle 306 and the third rectangle 307. The text "Cut-Copy" notes a function that is available through the second icon 302. The second rectangle 306 and the third rectangle 307 are separated by a gap in the vertical direction 53, 54 without overlapping. The second icon 302 is located at a center of the second display screen 202 in the widthwise direction 55, 56.

The second rectangle 306 represents a first half of the recording sheet 8 to be ejected firstly, on which the image of the first page is recorded. The second rectangle 306 contains figures representing the image from the original document 9 that may be read in the reading process. The figures in the second rectangle 306 are identical to the figures in the first rectangle 304 but are displayed in an orientation rotated by 90 degrees in a counterclockwise direction such that a leftward 55 side in the first rectangle 304 appears on an upper side in the second rectangle 306. The second rectangle 306 has two (2) shorter sides 312 and two (2) longer sides 313. The shorter sides 312 of the second rectangle 306 are located at positions along the widthwise direction 55, 56 in the first display screen 200. The longer sides 313 of the second rectangle 306 are located at positions along the vertical direction 53, 54 in the first display screen 200. The length of the longer sides 313 of the second rectangle 306 is substantially equal to the length of the shorter sides 310 of the first rectangle 304. Therefore, the user may recognize, before selecting the second icon 302, that the orientation of the first half of the recording sheet 8 will be turned from the uncut recording sheet 8, and the image from the original document 9 will be recorded on the first page being the first half of the recording sheet 8 in the posture rotated by 90 degrees.

The third rectangle 307 represents a second half of the recording sheet 8 to be ejected secondly, on which the image of the second page is recorded. The third rectangle 307 is located at a position below the second rectangle 306. The third rectangle 307 contains, similarly to the second rectangle 306, figures representing the image from the original document 9 that may be read in the reading process, and the figures are displayed in the orientation rotated by 90 degrees in the counterclockwise direction such that the leftward 55 side in the first rectangle 304 appears on an upper side in the third rectangle 307.

The third rectangle 307 has two (2) shorter sides 314 and two (2) longer sides 315. The shorter sides 314 of the third rectangle 307 are located at positions along the widthwise direction 55, 56 in the first display screen 200. The shorter sides 314 of the third rectangle 307 are parallel to the shorter sides 312 of the second rectangle 306. The longer sides 315 of the third rectangle 307 are located at positions along the vertical direction 53, 54 in the first display screen 200. The third rectangle 307 is located at a position offset from the second rectangle 306 in a direction of the longer sides 313 of the second rectangle 306, i.e., in the widthwise direction 55, 56. The longer sides 315 of the third rectangle 307 are parallel to the longer sides 313 of the second rectangle 306.

It may be noted that the figures representing the images from the original document 9 contained in the second rectangle 306 and the third rectangle 307 may not necessarily be identical or similar to any actual figures or text appearing on the original document 9. In the present embodiment, each of the second rectangle 306 and the third rectangle 307 contains three (3) horizontal lines in the upper area and a bar chart in the lower area. It may be noted that the upper area containing the horizontal lines in the third rectangle 307 being the half of the recording sheet 8 appears on the leftward 55 side in the first display screen 200. Meanwhile, the third rectangle 307 may not necessarily contain any figure representing the image from the original document 9. While the user is provided with at least the second rectangle 309 containing the figures representing the image from the original document 9 to help the user to recognize that the second rectangle 306 and the third rectangle 307 represent the halves of the recording sheet 8, the figures in the third rectangle 307 may be omitted.

The third icon 303 contains a figure representing a pair of scissors. The third icon 303 is located in the gap between the second rectangle 306 and the third rectangle 307 in the second icon 302. For example, the third icon 303 may be located rightward 56 with respect to a broken line, which is located between the second rectangle 306 and the third rectangle 307.

A fourth icon 318 includes text "Scan" and a figure representing the scanner with a cover being open, in which a horizontally-longer rectangle representing the original sheet 9 is set. The fourth icon 318 is located at a position rightward 56 in the widthwise direction 55, 56 in the first display screen 200. The fourth icon 318 represents the original document 9 to be read in the reading process in a form of a fourth rectangle 319 in the first display screen 200.

The fourth rectangle 319 represents the original document 9. The appearance of the fourth rectangle 319 may not necessarily coincide with any actual image of the original document 9. For example, the fourth rectangle 319 may contain a pie chart on a leftward 55 side and three (3) horizontal lines on a rightward 56 side. The pie chart may include lines extending in directions of 12 o'clock and 9 o'clock from a center. In the present embodiment, the figures contained in the second rectangle 306 and the figures contained in the fourth rectangle 319 are different; however, optionally, the figures contained in the second rectangle 306 and the figures contained in the fourth rectangle 319 may be identical.

In a lower area in the first display screen 200, the shortcut icon 210, the communication setting icon 211, the environment setting icon 212, and the ink remainders icon 213 are arranged in this given order from left to right. The shortcut icon 210 is an icon, to which commands frequently used by the user may be linked, so that the commands may be presented to the user easily, and may contain text "Shortcut." The communication setting icon 211 is an icon, through which a setting for connecting the image recording apparatus 10 with the external information apparatus is received, and may contain a sign representing radio waves. The environment setting icon 212 is an icon, through which an operation environment to the image recording apparatus 10 may be set, and may contain a sign representing tools. The ink remainders icon 213 is an icon, through which current remaining amounts of the inks may be displayed, and may contain illustration of gauges for the inks.

The controller 100 may switch the screens in the LCD 22 from the first display screen 200 to the auxiliary screen 200a or the auxiliary screen 200b (see FIG. 6) with the rightward 56 and leftward 55 arrows in the switcher icon 214 being highlighted and selected. Through the auxiliary screens 200a, 200b, the user may select functions other than the functions presented in the first display screen 200.

Figure 8:
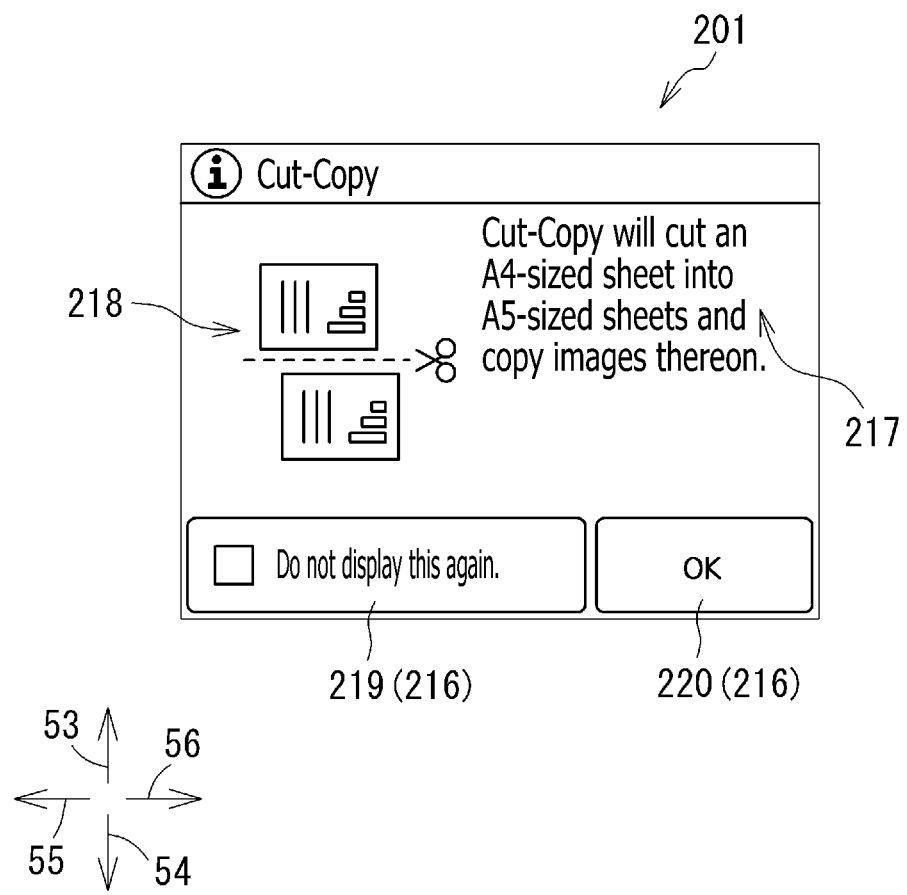
FIG. 8 is an illustrative view of a message screen 201 to be displayed in the LCD 22 of the image recording apparatus 10.

As shown in FIG. 8, the message screen 201 displays a message informing the user that the image recording process and the cutting process will be performed with the recording sheet 8. The message screen 201 contains a message 217, which explains in text that the image recording process and the cutting process will be performed, and a message icon 218, indicates in figures that the image recording process and the cutting process will be performed. The message icon 218 is identical to the second icon 302; therefore, description of the message icon 218 is herein omitted. Meanwhile, optionally, the message icon 218 may not necessarily be identical to the second icon 302. Moreover, the message 217 may not necessarily be limited to the example shown in FIG. 8 as long as the user may recognize that the image recording process and the cutting process will be performed. Optionally, the message 217 may be omitted.

The message screen 201 contains a fourth receivable portion 216, through which the user may select not displaying the message screen 201 in next and onward occasions when the user selects the first receivable portion 205, in a lower area in the message screen 201. The fourth receivable portion 216 may receive a command that restricts the image recording apparatus 10 from displaying the message screen 201 in the next and onward occasions according to the user's preference. The fourth receivable portion 216 contains a selecting button 219 and an OK button 220. Through the selecting button 219, the user's preference not to display the message screen 201 again in the next and onward occasions the user selects the first receivable portion 205 may be selected. Through the OK button 220, the selection made through the selecting button 219 may be entered, and the second display screen 202 may be displayed.

The controller 100 may operate the LCD 22 to display the second display screen 202 when the OK button 220 is selected, regardless of the selection of the user through the selecting button 219 in the message screen 201. In a case where the user selected the selecting button 219 in the fourth receivable portion 216 in an earlier occasion, and when the user now selects the first receivable portion 205 in the first display screen 200, the controller 100 operates the LCD 22 to display the second display screen 202. On the other hand, in a case where the user has not selected the selecting button 219 in the fourth receivable portion 216 since an earlier occasion, and when the user now selects the first receivable portion 205 in the first display screen 200, the controller 100 operates the LCD 22 to display the first display screen 200 again. The controller 100 operates the LCD 22 to display the first display screen 200 when the user operates the clear button 19c in the operation interface 19 while the message screen 201 is being displayed.

Figure 9:
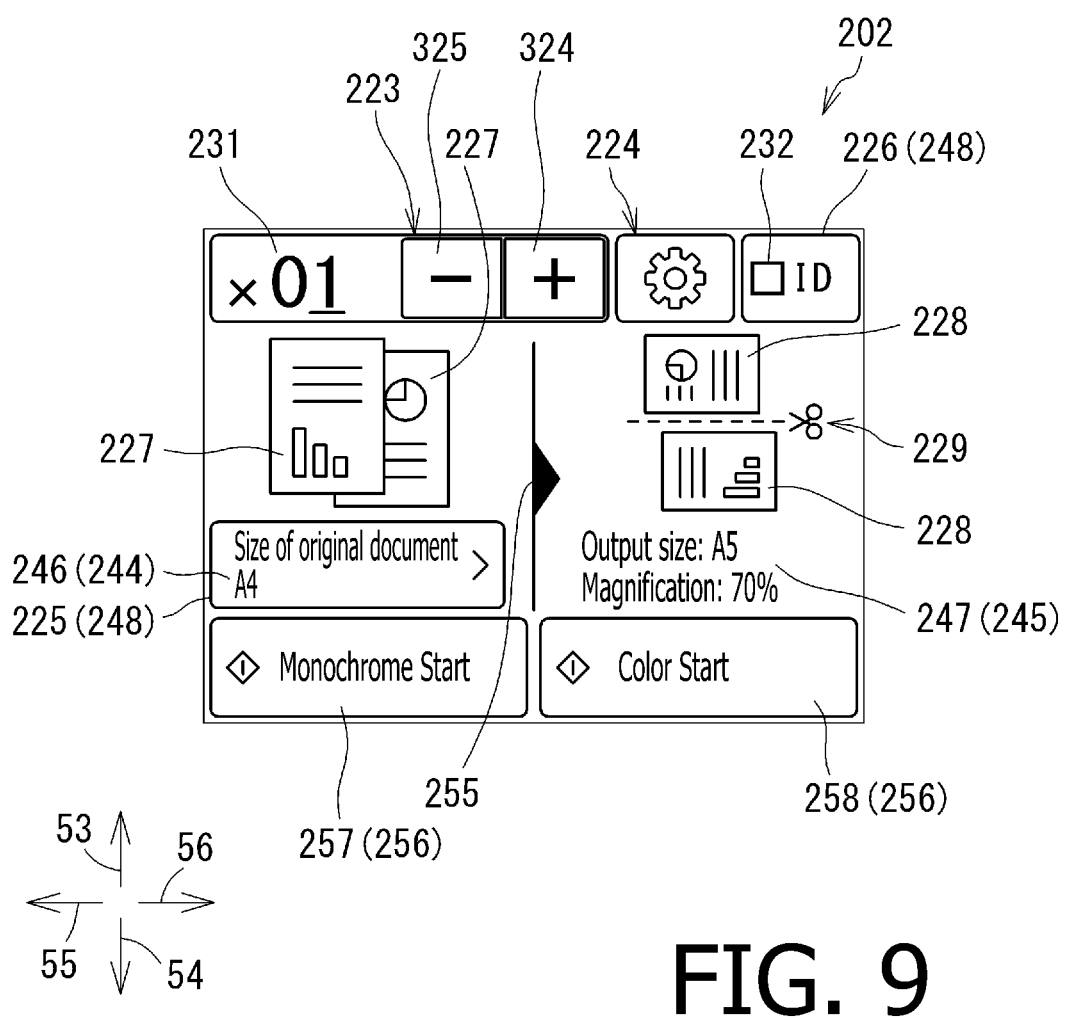
FIG. 9 is an illustrative view of a second display screen 202 to be displayed in the LCD 22 of the image recording apparatus 10.
Figure 10:
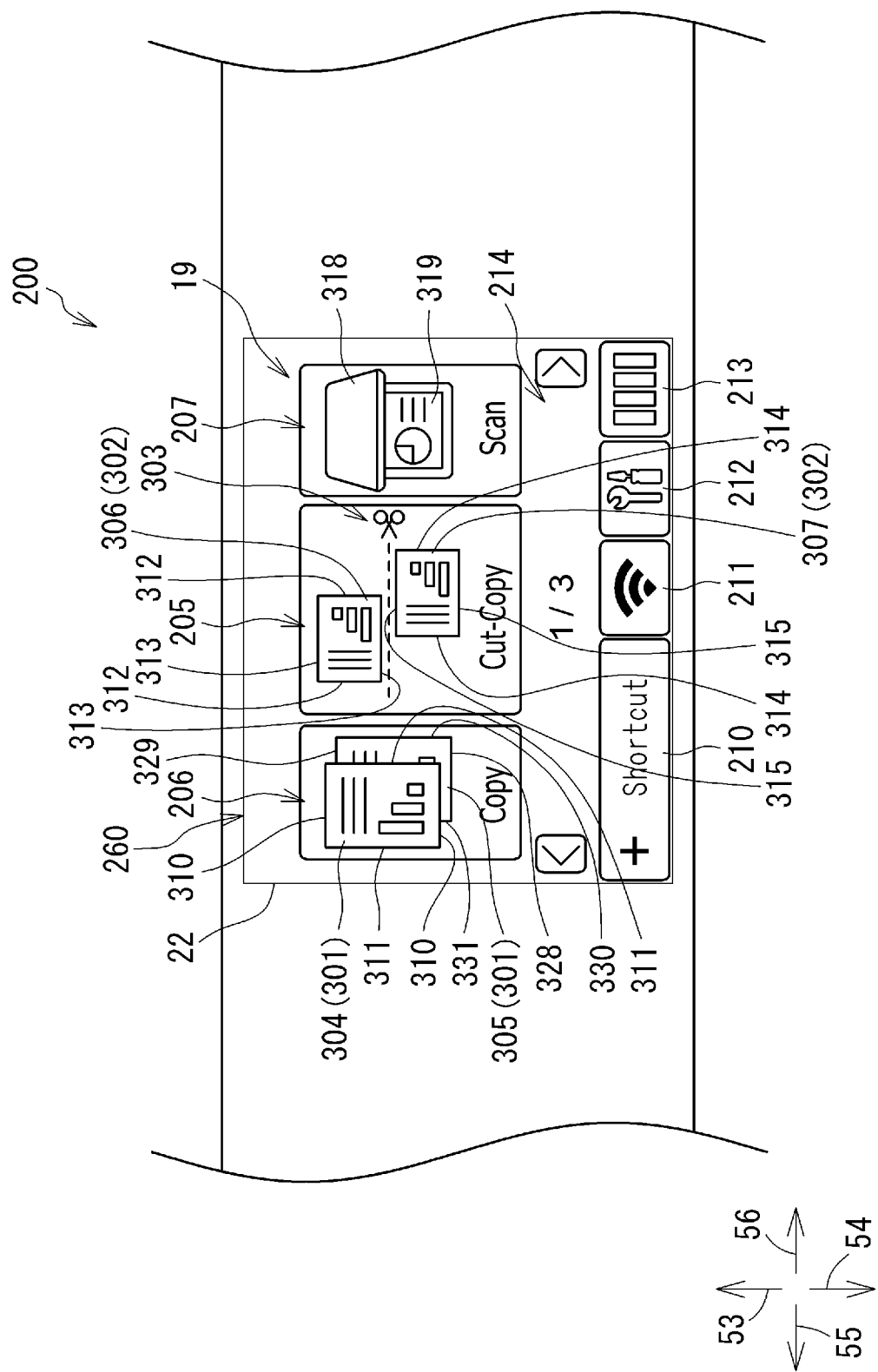
FIG. 10 is an illustrative view of a touch panel 260 of an image recording apparatus 10 in a first modified example.

The second display screen 202 is a screen to be displayed in the LCD 22 to visually illustrate the original document 9 to be processed in the reading process and the recording sheet 8 processed in the cutting process to the user before the reading process, the image recording process, and the cutting process are performed. As shown in FIG. 9, the second display screen 202 contains a plurality of icons. The second display screen 202 is substantially sectioned into four (4) tiers of an uppermost tier, an upper tier, a lower tier, and a lowermost tier, from top to bottom. The second display screen 202 contains a fifth receivable portion 223, a setting icon 224, and a second size-change receivable portion 226 in the uppermost tier; and a fifth icon 227, a sixth icon 228, and a seventh icon 229 in the upper tier.

The fifth receivable portion 223, the setting icon 224, and the second size-change receivable portion 226 are arranged along the widthwise direction 55, 56 in the uppermost tear in the second display screen 202.

The fifth receivable portion 223 includes a counter 231, a plus button 324, and a minus button 325. The counter 231 indicates a number of copies of the images from the original document 9 to be recorded on the recording sheets 8. In other words, the number displayed in the counter 231 indicates a number of copies of the original document 9 to be produced. The number of copies to be produced displayed in the counter 231 may be increased or decreased by the user with use of the plus button 324 or the minus button 325.

The setting icon 224 may receive changes in the settings for operating the image recording apparatus 10. The settings for operating the image recording apparatus 10 are not directly relevant to the present embodiment; therefore, detailed description of those is herein omitted.

The second size-change receivable portion 226 may receive a command to set the size of the original document 9 to a size of an ID card. The second size-change receivable portion 226 contains a checkbox 232 including text "ID." A checkmark may be displayed in the checkbox when the user operates the second size-change receivable portion 226. In response, the controller 100 may set the size of the original document 9 to the size of the ID card.

The fifth icon 227, the sixth icon 228, and the seventh icon 229 are arranged in the upper tier in the second display screen 202.

The fifth icon 227 represents the original document 9 to be processed in the image recording process. When the original document 9 is a collection single-sided sheets, the fifth icon 227 represents the first side 117 being a recto of a first sheet and the first side 117 being a recto of a second sheet in the collection. On the other hand, when the original document 9 is one or more double-sided sheets, and images of both sides of the sheets are to be read in the reading process, the fifth icon 227 represents the first side 117 and the second side of a first one of the both-sided sheets. In other words, the fifth icon 227 represents images of a first page to be read firstly from the original document 9 and a second page to be read secondly from the original document 9. The fifth icon 227 represents the images of the first page and the second page in two (2) vertically-longer rectangles that partly overlap each other. The fifth icon 227 is located on a leftward 55 side in the second display screen 202.

The sixth icon 228 contains two (2) horizontally-longer rectangles representing the recording sheet 8 cut in half the cutting process. The two rectangles are separated in the vertical direction 53, 54. The sixth icon 228 is located on a rightward 56 side of the second display screen 202.

The seventh icon 229 is located between the two rectangles in the sixth icon 228. The seventh icon 229 3 has the figure representing the pair of scissors.

The second display screen 202 includes a first size-information display 244 and a second size-information display 245. The first size-information display 244 and the second size-information display 245 are arranged along the widthwise direction 55, 56 in the lower tier in the second display screen 202.

The first size-information display 244 indicates a first size 246, which is the size of the original document 9. For example, the first size-information display 244 may contain text "Original Document Size" and text indicating a standard size such as A4, A5, etc., in two lines aligning one above the other. In the present embodiment, text "A4" is displayed; therefore, the user may recognize that the first size 246 being the size of the original document 9 is set to A4. The first size-information display 244 is located on the leftward 55 side in the second display screen 202.

The second size-information display 245 indicates a second size 247, which is the size of the recording sheet 8 after being cut in half. For example, the second size-information display 245 may contain text "Output Size:" and text indicating a standard size for a recording sheet 8 such as A4, A5, etc., which are parted in the widthwise direction 55, 56. Moreover, below the text "Output Size:" and the text indicating the standard size of the recording sheet 8, the second size-information display 245 may contain text "Magnification:" and percentage (%) of magnification, which are parted in the widthwise direction 55, 56. In the present embodiment, text "A5" and "70%" are displayed; therefore, the user may recognize that the second size 247 being the size of the recording sheet 8 is set to A5, which is minified to 70% from A4 being the size of the original document 9. The second size-information display 245 is located on the rightward 56 side in the second display screen 202.

The second display screen 202 further contains a size-change receivable portion 248, through which the user's action to change the first size 246 may be received. The size-change receivable portion 248 is arranged at a position to coincide at least with the first size-information display 244. In other words, the first size-information display 244 is an icon operable as the size-change receivable portion 248. The user may select the size-change receivable portion 248 displaying the first size 246 through the selecting button 19a in the operation interface 19 and enter a replacing size for the first size 246.

The size-change receivable portion 248 includes a first size-change receivable portion 225 and a second size-change receivable portion 226. As shown in FIG. 9, the first size-change receivable portion 225 is located at the position coincident with the first size-information display 244, and the second size-change receivable portion 226 is located on the rightward 56 side in the uppermost tier in the second display screen 202.

The user's action to the first size-change receivable portion 225 may switch the screen in the LCD 22 from the second display screen 202 to a second screen 250 (see FIG.

6), through which the user may select a size of the original document 9. The size of the original document 9 may include, for example, B5, A5, ID card, A4, and LTR. Moreover, the setting of the size of the original document 9 may include automatic detection, by which the size of the original document read by the scanner 12 may be detected automatically.

The second display screen 202 further contains an eighth icon 255. The eighth icon 255 is in a form of an arrow pointing from the fifth icon 227 toward the sixth icon 228. The eighth icon 255 is located at a center in the widthwise direction 55, 56 in the second display screen 202. The eighth icon 255 is located in an area ranging between the upper tier and the lower tier.

The second display screen 202 contains a record-start receivable portion 256, through which the user's command to start the reading process, the image recording process, and the cutting process may be received. The record-start receivable portion 256 includes a first record-start receivable portion 257 and a second record-start receivable portion 258. The first record-start receivable portion 257 and the second record-start receivable portion 258 are displayed in the lowermost tier in the second display screen 202.

The first record-start receivable portion 257 is an icon containing a rhombus figure and text "Monochrome Start." Through the first record-start receivable portion 257, a command for monochrome image recording may be received. When the user selects the first record-start receivable portion 257 and presses the enter button 19b, the reading process, the image recording process, and the cutting process start, and monochrome images may be recorded on the recording sheet 8.

The second record-start receivable portion 258 is an icon containing a rhombus figure and text "Color Start." Through the second record-start receivable portion 258, a command for multicolored image recording may be received. When the user selects the second record-start receivable portion 258 and presses the enter button 19b, the reading process, the image recording process, and the cutting process start, and multicolored images may be recorded on the recording sheet 8.

[Benefits by the Embodiment]

According to the image recording apparatus 10, the operation interface 19 has the first receivable portion 205, through which the user may select the reading process to be performed to the original document 9, the image recording process to be performed to the recording sheet 8, and the cutting process to cut the recording sheet 8, collectively in a single action. Therefore, when the user uses the image recording apparatus 10 for copying images, in which the images of the original document 9 is read in the reading process and recorded on the recording sheet 8 in the recording process, and for cutting the recording sheet 8 with the images recorded thereon, the user may enter the settings for the cutting process without being confused or lost.

Moreover, the operation interface 19 has not only the first receivable portion 205 but also the second receivable portion 206, through which the image recording process to the recording sheet 8 may be selected with a single action by the user. Therefore, the user may select the first receivable portion 205 when the recording sheet 8 needs to be cut or may select the second receivable portion 206 when the recording sheet 8 needs not to be cut. Thus, the user may cause the image recording apparatus 10 to perform the reading process, the image recording process, and the cutting process in the less complicated operation.

The first receivable portion 205 displayed in the LCD 22 is presented to the user to be selected with the physical keys 23. In this arrangement, the image recording apparatus 10 may not necessarily have a touch panel. Therefore, the image recording apparatus 1 may be manufactured in lower cost.

The first receivable portion 205 and the second receivable portion 206 are displayed simultaneously in the first display screen 200. Therefore, the user may select whether the duplicating process is to be performed, or alternatively, the reading process and the image recording process, and the cutting process are to be performed sequentially, based on the visual presentation with the first display screen 200 alone.

In the first display screen 200, further to the first receivable portion 205 and the second receivable portion 206, the third receivable portion 207 is displayed. Therefore, with the easier action, the user may select one of three options: the duplicating process; the reading process, the image recording process, and the cutting process; and the reading process.

The first display screen 200 to display the first receivable portion 205 is the standby screen. Therefore, the user may access the first display screen 200 promptly and find the first receivable portion 205 easily.

When the user selects the first receivable portion 205 through the first display screen 200, the message 217 notifying the user that the reading process, the image recording process, and the cutting process will be performed is displayed. Therefore, the user may be helped to recognize the operation he/she selected, and an erroneous selection made through the first display screen 200 may be restrained from being processed further.

After the user enters the preference of not displaying the message 217 in next and onward occasions through the fourth receivable portion 216, the controller 100 may restrict the message 217 from being displayed in the next and onward occasions when the user selects the second receivable portion 206. Optionally, for example, the controller 100 may display the message 217 at predetermined frequency. Therefore, when the user is aware of the content of the message 217, the user may be released from being bothered by the message 217.

The second display screen 202 includes the first record-start receivable portion 257 and the second record-start receivable portion 258. Therefore, the user may make the selection between the options of multicolor image recording process and monochrome image recording process while viewing the second display screen 202 alone.

The user may enter a number of copies to be produced in the image recording process through the fifth receivable portion 223 in the second display screen 202. Therefore, the user may recognize how many number of copies to be produced in the image recording process through the second display screen 202 and may recognize how many number of copies to be produced further while the image recording process is being performed.

The user may view the icon representing the recording sheet 8 being cut in the first receivable portion 205 and thereby easily recognize the first receivable portion 205 works as an icon linked to the function to cut the recording sheet 8.

In the second icon 302, the shorter sides 312 of the second rectangle 306 and the shorter sides 314 of the third rectangle 307 are parallel. Therefore, the user may recognize that the second rectangle 306 and the third rectangle 307 in the second icon 302 represent the pieces of the recording sheet 8 cut in half.

In the second icon 302, the second rectangle 306 and the third rectangle 307 are located at the positions offset from each other in the direction of the longer sides 313 of the second rectangle 306. Therefore, the user may easily recognize that the second icon 302 expresses the state of the recording sheet 8 cut in half.

The third icon 303 that represents the pair of scissors located between the second rectangle 306 and the third rectangle 307 may help the user to recognize that the first receivable portion 205 is linked to the function for cutting the recording sheet 8.

The longer side 313 of the second rectangle 306 are parallel to the shorter sides 310 of the first rectangle 304. Therefore, the user may recognize the orientations of the first rectangle 304 and the second rectangle 306 and easily understand the first rectangle 304 represents the original document 9 while the second rectangle 306 represents the recording sheet 8 cut in half.

First Modified Example

In the embodiment described above, the image recording apparatus 10 has the operation interface 19 and the LCD 22 on the upper-frontward surface, and the screens in the LCD 22 may shift from one to another according to the user's action on the operation interface 19. However, optionally, the operation interface 19 and the LCD 22 may be combined into a touch panel 260.

In this arrangement, the operation interface 19 may be displayed in the LCD 22. The user may touch the operation interface 19 being displayed in the LCD 22 to operate the image recording apparatus 10.

[Benefit by the First Modified Example]

With the operation interface 19 displayed in the LCD 22, the user may directly touch the receivable portions and the icons in the touch panel 260 to select the options to operate the image recording apparatus 10. In this arrangement, the direct touching actions may be easier than selecting the receivable portions and the icons through the physical keys 23.

Second Modified Example

The first receivable portion 205 and the second receivable portion 206, which are selectable through the operation interface 19, may not necessarily be displayed in the first display screen 200. For example, the first receivable portion 205 and the second receivable portion 206 may be provided in a form of physical keys 23, as shown in FIG. 11. For another example, although not shown in the drawings, while the second receivable portion 206 may be provided in the first display screen 200, the first receivable portion 205 alone may be provided in the form of a physical key 23.

[Benefit by the Second Modified Example]

With the first receivable portion 205 provided in the form of the physical key 23, the user may recognize the first receivable portion 205 distinctively and operate the first receivable portion 205 easily and correctly.

More Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The scanner 12 may not necessarily have the first CIS 85 and the second CIS 88, which read the first side 117 and the second side 118 of the original sheet 9, respectively. Optionally, for example, the scanner 12 may be configured to read solely the first side 117 of the original sheet 9 with the first CIS 85 alone. In this arrangement, the scanner 12 may perform a first reading process, in which the first CIS 85 reads the first side 117 of a first one of the original sheets 9, and a second reading process, in which the first CIS 85 reads the first side 117 of a second one of the original sheets 9.

For another example, the cutter assembly 45 in the embodiment described above has the cutter 83 and the stationary blade 95 to cut the recording sheet 8. However, optionally, the structure of the cutter assembly 45 may not necessarily be limited as long as the cutter assembly 45 may cut the recording sheet 8 along the widthwise direction 55, 56. For example, in place of the stationary blade 95, the cutter assembly 45 may have disc-formed two rotary blades similarly to the cutter 83 mounted on the cutter carriage 82.

In the embodiment described above, the A4-sized recording sheet 8 is cut at the central position in the conveying direction 7 into two A5-sized recording sheets. However, the size of the recording sheet 8 and the position to cut the recording sheet 8 may not necessarily be limited. Moreover, the size of the recording sheet 8 may not necessarily be limited to A4 but may be A3, B4, B5, or other non-standard or irregular size. For another example, the position to cut the recording sheet 8 may be displaced from the central position in the conveying direction 7. In other words, the recording sheet 8 may be cut into two pieces, which are in different sizes. For another example, the recording sheet 8 may be cut at two or more positions, the cutter assembly 45 may cut the recording sheet 8 into three or more pieces, and the sixth icon 228 may contain three or more rectangles.

For another example, the image recording apparatus 10 may not necessarily perform the reading process, in which the images are read from the A4-sized original sheets 9, the recording process, in which the images from the original sheets 9 are recorded on the A4-sized recording sheet 8, and the cutting process, in which the recording sheet 8 with the recorded images is cut into two A5-sized recording sheets, in this given order. For example, the image recording apparatus 10 may perform the cutting process, in which the A4-sized recording sheet 8 is cut into two A5-sized recording sheets 8, and the image recording process, in which the images from the original sheets 9 read in the reading process may be recorded on the two A5-sized recording sheets 8. For another example, the image recording apparatus 10 may perform the reading process, in which the images are read from the original sheets 9, the image recording process, in which one of the images is recorded in a first half area in the uncut A4-sized recording sheet 8, the cutting process, in which the recording sheet 8 is cut into an A5-sized recording sheet including the first half area containing the recorded image and another A5-sized recording sheet including a second half area of the recording sheet 8, and the image recording process, in which the other image from the original sheets 9 is recorded on latter A5-sized recording sheet including the second half area.

For another example, after the displaying process, the image recording apparatus 10 may not necessarily perform the reading process, the image recording process, and the cutting process in this given order, but the image recording apparatus 10 may perform the cutting process, the reading process, and the image recording process, in this given order.

For another example, the image recording apparatus 10 may not necessarily perform the displaying process, the reading process, the image recording process, and the cutting process, in this given order, but the image recording apparatus 10 may perform the displaying process after the reading process and before the image recording process and the cutting process.

For another example, the screens displayed in the LCD 22 may not necessarily be entirely switched from one to another in response to the user's selecting action to one of the icons displayed in the screen, but the screens may be partly switched from one to another in response to the user's selecting action.

For another example, the message screen 201 may not necessarily be displayed in the entire LCD 22 in response to the user's action to enter the command to cause the image recording apparatus 10 to perform the reading process, the image recording process, and the cutting process, but the message screen 201 may be displayed as a popup window in a limited area in the LCD 22. For another example, the LCD 22 may have a message-displayable bar (not shown), in which a plurality of types of messages may be displayed, in a limited area in the LCD 22 or in an area separated from the LCD 22, and the contents of the message screen 201 may be displayed in the message-displayable bar.

For another example, the message screen 201 may not necessarily have the fourth receivable portion 216, through which the user's preference not to display the message screen 201 in the next and onward occasions when the user selects the first receivable portion 205 is accepted. For example, the message screen 201 may set to be never displayed or may set to be displayed once in a predetermined number of occasions. For another example, the message screen 201 may be displayed in limited occasions according to the user's preference.

For another example, the second icon 302 in the first display screen 200 may not necessarily contain the second rectangle 306 and the third rectangle 307 alone, which represent t the recording sheet 8 cut into two pieces. Optionally, the recording sheet 8 may be cut into two or more pieces by the cutter assembly 45, and the second icon 302 may contain the second rectangle 306, the third rectangle 307, and more rectangles that represent the recording sheet 8 cut into pieces.

For another example, the figure in the third icon 303 may not necessarily be limited to the figure representing the whole shape of the pair of scissors. For example, the figure in the third icon 303 may be a figure representing blades alone being a part of the pair of scissors. For another example, the third icon 303 may contain a figure representing a cutting tool such as a knife.

For another example, the rectangles in the first icon 301 may not necessarily be limited to two rectangles, i.e., the first rectangle 304 and the another rectangle 305, but the first icon 301 may contain three or more rectangles. The first icon 301 showing a plurality of rectangles may help the user to recognize that the images may be recorded on a plurality of recording sheets 8 in a single copying operation. In the meantime, optionally, the first icon 301 may not contain the another rectangle 305 but contain the first rectangle 304 alone.

For another example, location where the screens are to be displayed may not necessarily be limited to the LCD 22 in the image recording apparatus 10, but the screens may be displayed in an external information device (not shown) such as a computer, a smartphone, and a tablet terminal connected in wire or wirelessly with the image recording apparatus 10. In other words, the screens 200, 200*a*, 200*b*, 201, 202, 202*a*, 250, 300 shown in FIGS. 6-10 may be displayed in a display device of the external information apparatus, and the user may operate the external information apparatus through an input device such as mouse, keyboard, and touch panel to select the icons and enter the selections.

What is claimed is:

1. An image recording apparatus, comprising:
a conveyer configured to convey a sheet along a conveying direction;
an image recorder configured to record an image on the sheet being conveyed by the conveyer;
a cutter assembly configured to cut the sheet;
a reader configured to read an image of a readable medium;
a display device configured to display a screen;
a controller configured to:
control the display device to display a plurality of selectable portions including a specific selectable portion, the plurality of selectable portions being presented to a user to select one therefrom,
wherein, when the specific selectable portion is selected by the user in a state where none of controlling the reader to read the image of the readable medium, controlling the image recorder to record the image of the readable medium read by the reader on the sheet, and controlling the cutter assembly to cut the sheet at a predetermined position in the conveying direction is selected, the controller is configured to shift to a state where all of controlling the reader to read the image of the readable medium, controlling the image recorder to record the image of the readable medium read by the reader on the sheet, and controlling the cutter assembly to cut the sheet at the predetermined position in the conveying direction are selected.

2. The image recording apparatus according to claim 1, further comprising an operation interface configured to receive actions from the user, the operation interface comprising:
a first receivable portion, through which the selection from the user to select the specific selectable portion is receivable in a single action; and
a second receivable portion, through which a selection from the user for causing the controller to control the reader to read the image of the readable medium and control the image recorder to record the image of the readable medium read by the reader on the sheet is receivable in a single action.

3. The image recording apparatus according to claim 2, wherein
the controller is configured to display a screen in the display device prior to controlling the reader to read the image of the readable medium, controlling the image recorder to record the image of the readable medium read by the reader on the sheet, and controlling the cutter assembly to cut the sheet at the predetermined position, the specific selectable portion is displayed in the screen, and the operation interface further comprises a physical key as the first receivable portion to select the specific selectable portion.

4. The image recording apparatus according to claim 3, wherein the screen displays the first receivable portion and the second receivable portion.

5. The image recording apparatus according to claim 4, wherein
the operation interface further comprises a third receivable portion, through which a selection from the user for causing the controller to control the reader alone among the reader, the image recorder, and the cutter assembly to read the image of the readable medium is receivable, and
the third receivable portion is displayed in the screen.

6. The image recording apparatus according to claim 3, wherein, in the image recording apparatus operating in a standby mode, the controller is configured to control the display device to display the screen as a standby screen.

7. The image recording apparatus according to claim 3, wherein, on condition that the first receivable portion displayed in the screen receives the selection from the user, the controller controls the display device to display a message indicating that the selection for causing the controller to control the reader to read the image of the readable medium, control the image recorder to record the image of the readable medium read by the reader on the sheet, and control the cutter assembly to cut the sheet at the predetermined position is made.

8. The image recording apparatus according to claim 7, wherein the controller is configured to:
control the display device to display a third receivable portion along with the message, and
on condition that the third receivable portion receives a selection from the user, restrict the display device from displaying the message in next and onward occasions when the first receivable portion receives the selection from the user.

9. The image recording apparatus according to claim 2, wherein
the controller is configured to display a screen in the display device prior to controlling the reader to read the image of the readable medium, controlling the image recorder to record the image of the readable medium read by the reader on the sheet, and controlling the cutter assembly to cut the sheet at the predetermined position,
the first receivable portion is displayed in the screen, and
the operation interface and the display device form a touch panel.

10. The image recording apparatus according to claim 9, wherein the screen displays the first receivable portion and the second receivable portion.

11. The image recording apparatus according to claim 10, wherein
the operation interface further comprises a third receivable portion, through which a selection from the user for causing the controller to control the reader to read the image of the readable medium alone is receivable, and
the third receivable portion is displayed in the screen.

12. The image recording apparatus according to claim 9, wherein, in the image recording apparatus operating in a standby mode, the controller is configured to control the display device to display the screen as a standby screen.

13. The image recording apparatus according to claim 9, wherein, on condition that the first receivable portion displayed in the screen receives the selection from the user, the controller controls the display device to display a message indicating that the selection for causing the controller to control the reader to read the image of the readable medium, control the image recorder to record the image of the readable medium read by the reader on the sheet, and control the cutter assembly to cut the sheet at the predetermined position is made.

14. The image recording apparatus according to claim 13, wherein the controller is configured to:
control the display device to display a third receivable portion along with the message, and
on condition that the third receivable portion receives a selection from the user, restrict the display device from displaying the message in next and onward occasions when the first receivable portion receives the selection from the user.

15. The image recording apparatus according to claim 2, wherein
the second receivable portion includes a first icon, the first icon including a first rectangle representing the sheet, and
the first receivable portion includes a second icon, the second icon including at least two rectangles including a second rectangle and a third rectangle, the second rectangle and the third rectangle representing the sheet cut into pieces.

16. The image recording apparatus according to claim 15, wherein the second rectangle and the third rectangle are in an arrangement such that shorter sides of the second rectangle and shorter sides of the third rectangle are parallel.

17. The image recording apparatus according to claim 16, wherein the third rectangle is located at a position offset from the second rectangle in a direction of longer sides of the second rectangle.

18. The image recording apparatus according to claim 15, wherein
the third rectangle is separated from the second rectangle by a gap in a direction of shorter sides of the second rectangle,
the second icon further includes a third icon located in the gap between the second rectangle and the third rectangle, and
the third icon represents at least a part of a pair of scissors.

19. The image recording apparatus according to claim 15, wherein the second icon is in an arrangement such that longer sides of the second rectangle are parallel to shorter sides of the first rectangle.

20. The image recording apparatus according to claim 2, wherein at least the first receivable portion is a physical key.

21. The image recording apparatus according to claim 2, wherein the controller is configured to, in response to the first receivable portion receiving the selection from the user, control the display device to display a setting display screen, the setting-display screen including a first record-start receivable portion, the first record-start receivable portion being configured to receive a selection from the user for causing the controller to control the image recorder to record the image in colors, and a second record-start receivable portion, the second record-start receivable portion being configured to receive a selection from the user for causing the controller to control the image recorder to record the image in monochrome.

22. The image recording apparatus according to claim 21, wherein the setting-display screen includes a third receivable portion, the third receivable portion being configured to receive a setting with respect to a number of copies to be produced by the image recorder recording the image of the readable medium on the sheet.

23. The image recording apparatus according to claim 1, further comprising a record-start receivable portion,
   wherein the controller is configured to, in the state where all of controlling the reader to read the image of the readable medium, controlling the image recorder to record the image of the readable medium read by the reader on the sheet, and controlling the cutter assembly to cut the sheet at the predetermined position in the conveying direction are selected, when the record-start receivable portion is selected by the user, start performing actions including an action to control the reader to read the image of the readable medium, an action to control the image recorder to record the image of the readable medium read by the reader on the sheet, and an action to control the cutter assembly to cut the sheet at the predetermined position in the conveying direction.

24. An image recording apparatus, comprising:
   a conveyer configured to convey a sheet along a conveying direction;
   an image recorder configured to record an image on the sheet being conveyed by the conveyer;
   a cutter assembly configured to cut the sheet;
   a reader configured to read an image of a readable medium;
   a display device configured to display a screen;
   a controller configured to:
      control the reader to read the image of the readable medium;
      control the image recorder to record the image of the readable medium read by the reader on the sheet; and
      control the cutter assembly to cut the sheet at a predetermined position in the conveying direction, and
   an operation interface configured to receive actions from a user, the operation interface comprising a receivable portion, through which a selection from the user for causing the controller to control the reader to read the image of the readable medium, control the image recorder to record the image of the readable medium read by the reader on the sheet, and control the cutter assembly to cut the sheet at the predetermined position is receivable in a single action,
   wherein the single action by the user to the receivable portion causes the controller to control the display device to display a setting screen, in which settings for reading the image, recording the image on the sheet, and cutting the sheet are collectively presented to the user.

25. An image recording apparatus, comprising:
   a conveyer configured to convey a sheet along a conveying direction;
   an image recorder configured to record an image on the sheet being conveyed by the conveyer;
   a cutter assembly configured to cut the sheet;
   a reader configured to read an image of a readable medium;
   a plurality of selectable portions including a specific selectable portion, the plurality of selectable portions being presented to a user to select one therefrom; and
   a controller configured to, when the specific selectable portion is selected by the user in a state where none of controlling the reader to read the image of the readable medium, controlling the image recorder to record the image of the readable medium read by the reader on the sheet, and controlling the cutter assembly to cut the sheet at a predetermined position in the conveying direction is selected, shift to a state where all of controlling the reader to read the image of the readable medium, controlling the image recorder to record the image of the readable medium read by the reader on the sheet, and controlling the cutter assembly to cut the sheet at the predetermined position in the conveying direction are selected.

* * * * *